(12) United States Patent
Zeifman

(10) Patent No.: US 11,561,022 B2
(45) Date of Patent: Jan. 24, 2023

(54) SYSTEM AND METHOD FOR CHARACTERIZATION OF AIR LEAKAGE IN BUILDING USING DATA FROM COMMUNICATING THERMOSTATS AND/OR INTERVAL METERS

(71) Applicant: Fraunhofer USA, Inc., Plymouth, MI (US)

(72) Inventor: Michael Zeifman, Sharon, MA (US)

(73) Assignee: FRAUNHOFER USA, INC., Plymouth, MI (US)

( * ) Notice: Subject to any disclaimer, the term of this patent is extended or adjusted under 35 U.S.C. 154(b) by 519 days.

(21) Appl. No.: 16/151,269

(22) Filed: Oct. 3, 2018

(65) Prior Publication Data
US 2019/0041081 A1    Feb. 7, 2019

Related U.S. Application Data

(63) Continuation-in-part of application No. 15/681,299, filed on Aug. 18, 2017, and a continuation-in-part of application No. 15/681,306, filed on Aug. 18, 2017.
(Continued)

(51) Int. Cl.
*F24F 11/63* (2018.01)
*G06F 30/13* (2020.01)
(Continued)

(52) U.S. Cl.
CPC ............ *F24F 11/63* (2018.01); *G01R 21/006* (2013.01); *G05B 19/042* (2013.01);
(Continued)

(58) Field of Classification Search
CPC .... F24F 11/63; F24F 2110/10; F24F 2140/60; G06Q 50/06; G06Q 10/063;
(Continued)

(56) References Cited

U.S. PATENT DOCUMENTS 5,566,084 A   10/1996 Cmar
5,680,590 A   10/1997 Parti
(Continued)

OTHER PUBLICATIONS

K. Gowri et al., "Infiltration Modeling Guidelines for Commercial Building Energy Analysis", PNNL-18898, Prepared for the U.S. Department of Energy under Contract DE-AC05-76RL01830, Sep. 2009, 21 p.*
(Continued)

*Primary Examiner* — Alexander Satanovsky
(74) *Attorney, Agent, or Firm* — Foley & Lardner LLP

(57) ABSTRACT

Systems and methods for characterization of retrofit opportunities are described. Some embodiments are directed to methods for determining the air leakage rate of a building, and accordingly, for determining suitability of sealing of air leaks to improve the energy efficiency of a building. The methods may comprise computing, using at least one computing device disposed remote from a building and based at least in part on heating, ventilation and air conditioning (HVAC) runtime data associated with the building, one or more thermal characteristics of the building. The HVAC runtime data may be computed based on data received from a thermostat or a meter, such as an electric or a gas meter. To isolate the impact of air leakage, subsets of the HVAC runtime data at time intervals selected to have substantially the same conditions, but different wind speeds, may be computed.

18 Claims, 12 Drawing Sheets

Related U.S. Application Data

(60) Provisional application No. 62/377,095, filed on Aug. 19, 2016, provisional application No. 62/377,110, filed on Aug. 19, 2016, provisional application No. 62/377,110, filed on Aug. 19, 2016, provisional application No. 62/377,095, filed on Aug. 19, 2016.

(51) Int. Cl.

| | | |
|---|---|---|
| *G05B 19/042* | (2006.01) | |
| *G01R 21/00* | (2006.01) | |
| *G05D 23/19* | (2006.01) | |
| *G06Q 10/06* | (2012.01) | |
| *G06Q 50/06* | (2012.01) | |
| *G06F 119/06* | (2020.01) | |
| *F24F 140/60* | (2018.01) | |
| *F24F 110/10* | (2018.01) | |

(52) U.S. Cl.
CPC ......... *G05D 23/1917* (2013.01); *G06F 30/13* (2020.01); *G06Q 10/063* (2013.01); *G06Q 50/06* (2013.01); *F24F 2110/10* (2018.01); *F24F 2140/60* (2018.01); *G05B 2219/2614* (2013.01); *G06F 2119/06* (2020.01)

(58) Field of Classification Search
CPC ............. G06F 17/5004; G06F 2217/78; G01R 21/006; G05D 23/1917; G05B 19/042; G05B 2219/2614
See application file for complete search history.

(56) References Cited

U.S. PATENT DOCUMENTS

| | | | |
|---|---|---|---|
| 6,134,511 A | 10/2000 | Subbarao | |
| 9,057,649 B2 | 6/2015 | Steinberg et al. | |
| 9,092,040 B2 | 7/2015 | Fadell et al. | |
| 9,261,863 B2 | 2/2016 | Sloop et al. | |
| 9,709,449 B2 | 7/2017 | Lange et al. | |
| 2003/0026588 A1 | 2/2003 | Elder et al. | |
| 2006/0111816 A1* | 5/2006 | Spalink ............. | G05D 23/1931 700/276 |
| 2008/0140748 A1 | 6/2008 | Lada | |
| 2011/0061794 A1 | 3/2011 | Song | |
| 2011/0125787 A1* | 5/2011 | Choi .................... | G11B 27/034 707/769 |
| 2011/0179732 A1* | 7/2011 | Ermer ................... | B08B 15/00 52/236.3 |
| 2011/0257911 A1 | 10/2011 | Drees et al. | |
| 2012/0016524 A1 | 1/2012 | Spicer et al. | |
| 2012/0065783 A1 | 3/2012 | Fadell et al. | |
| 2012/0215475 A1 | 8/2012 | Rutledge et al. | |
| 2012/0296482 A1 | 11/2012 | Steven et al. | |
| 2013/0060471 A1 | 3/2013 | Ascheim et al. | |
| 2013/0190940 A1 | 7/2013 | Sloop et al. | |
| 2014/0058572 A1* | 2/2014 | Stein ................. | H02J 13/00004 700/291 |
| 2014/0278165 A1* | 9/2014 | Wenzel ............. | G06Q 10/0639 702/61 |
| 2014/0278203 A1 | 9/2014 | Lange et al. | |
| 2014/0303789 A1 | 10/2014 | Wroblewski et al. | |
| 2014/0324404 A1 | 10/2014 | de la Torre-Bueno | |
| 2014/0379298 A1* | 12/2014 | Gilbert .................. | G01K 17/06 702/182 |
| 2015/0081384 A1* | 3/2015 | Zeifman ............ | G06Q 30/0202 705/7.31 |
| 2015/0159422 A1 | 7/2015 | Pettit | |
| 2015/0276495 A1* | 10/2015 | Smullin ................... | G01K 3/04 702/130 |
| 2015/0355215 A1* | 12/2015 | Wang ........................ | G01P 5/02 73/170.11 |
| 2016/0018835 A1 | 1/2016 | Gaasch et al. | |
| 2016/0044246 A1* | 2/2016 | Yamada ............. | H04N 5/23212 348/349 |
| 2016/0266594 A1* | 9/2016 | Kauffman .............. | G06Q 50/06 |
| 2016/0334126 A1* | 11/2016 | Shiel ....................... | G06Q 10/00 |
| 2016/0377309 A1* | 12/2016 | Abiprojo .............. | G05B 19/042 700/276 |
| 2017/0104648 A1* | 4/2017 | Meier ..................... | H04W 4/80 |
| 2017/0329357 A1* | 11/2017 | Torres .................... | G05B 15/02 |
| 2018/0068034 A1 | 3/2018 | Zeifman et al. | |
| 2018/0087798 A1 | 3/2018 | Zeifman et al. | |
| 2019/0041081 A1 | 2/2019 | Zeifman | |

OTHER PUBLICATIONS

Mark Modera et al., "Simplified Methods for Combining Mechanical Ventilation and Natural Infiltration", Technical Series for the Department of Heating and Ventilating, Royal Institute of Technology, Stockholm, Sweden, 1985, 17 pages.*

F. Allard et al., "Wind-Induced Ventilation", Ashrae Transactions 1989. V 95, PI 2.*

* cited by examiner

SYSTEM AND METHOD FOR CHARACTERIZATION OF AIR LEAKAGE IN BUILDING USING DATA FROM COMMUNICATING THERMOSTATS AND/OR INTERVAL METERS

RELATED APPLICATIONS

This Application is a continuation-in-part, and claims the benefit under 35 U.S.C. § 120, of U.S. Non-Provisional application Ser. No. 15/681,299, titled "SYSTEM AND METHOD FOR CHARACTERIZATION OF RETROFIT OPPORTUNITIES IN BUILDING USING DATA FROM INTERVAL METERS," filed on Aug. 18, 2017, and is a continuation-in-part, and claims the benefit under 35 U.S.C. § 120, of U.S. Non-Provisional application Ser. No. 15/681,306, titled "SYSTEM AND METHOD FOR CHARACTERIZATION OF RETROFIT OPPORTUNITIES IN BUILDING USING DATA FROM COMMUNICATING THERMOSTATS," filed on Aug. 18, 2017, each of which is herein incorporated by reference in its entirety.

FEDERALLY SPONSORED RESEARCH

This invention was made with U.S. Government support under U.S. Department of Energy Grant No. DE-EE0007571. The Government may have certain rights to this invention.

BACKGROUND

Heating, ventilation and air conditioning (HVAC) systems are often used inside buildings to maintain the indoor temperature and humidity within a desired temperature range, and for other applications, such as ventilation. An HVAC system is typically connected to a thermostat setting the desired temperature. The thermostat can include a temperature sensor for monitoring the indoor temperature. If the measured temperature deviates from the set point, the thermostat controls the HVAC system to increase or decrease the indoor temperature.

Ideally, the building is perfectly insulated from the outdoor environment and heat transfer is minimized. However, no building is perfectly insulated, and even good insulation may deteriorate with age. As a result, heat is transferred with the outdoor environment and additional energy is needed to maintain the desired indoor temperature. The HVAC efficiency may also deteriorate with time, partly due to aging mechanical parts and partly due to deterioration of the heat distribution system (e.g., the ducts).

SUMMARY

Some embodiments are directed to a method comprising receiving, using at least one computing device disposed remote from a building, measured thermal data from a thermostat disposed at the building, the measured thermal data comprising first indoor temperature data associated with the building, computing, based on a mathematical model and using the at least one computing device, second indoor temperature data associated with the building, the mathematical model including one or more thermal characteristics of the building, the one or more thermal characteristic of the building comprising at least one selected from the group consisting of a value indicative of a thermal insulation, a value indicative of an air leakage rate and a value indicative of a heating, ventilation and air conditioning (HVAC) efficiency, down-selecting, using the at least one computing device, the first indoor temperature data to one or more periods of low heat transfer, computing, using the at least one computing device, the one or more thermal characteristics of the building, wherein the computing comprises fitting the second indoor temperature data with the down-selected first indoor temperature data, and determining, using the at least one computing device, suitability of the building for a retrofit opportunity to improve energy efficiency of the building, wherein determining the suitability comprises evaluating the one or more thermal characteristics.

In some embodiments, the method further comprises receiving, with the at least one computing device, measured thermal data from a communicating thermostat disposed at the building, the measured thermal data comprising the HVAC runtime data, the one or more thermal characteristics of the building are one or more first thermal characteristics of the building; and determining suitability of the building for the retrofit opportunity comprises simulating, using the at least one computing device, an effect of performance of the retrofit opportunity on the building, estimating, based at least in part on the simulating, one or more second thermal characteristics of the building that would result from the performance of the retrofit opportunity, and computing, using the at least one computing device, a prospective cost saving by comparing the computed one or more first thermal characteristics of the building with the one or more second thermal characteristics of the housing.

In some embodiments, receiving, with the at least one computing device, the measured thermal data from the communicating thermostat disposed at the building further comprises receiving, with the at least one computing device, data corresponding to an indoor temperature and/or a thermostat set point.

In some embodiments, computing the one or more thermal characteristics of the building based at least in part on the measured thermal data comprises computing, based at least in part on the measured thermal data, a value indicative of a thermal resistivity or thermal capacitance of the building.

In some embodiments, computing the value indicative of the thermal resistivity or thermal capacitance of the building comprises computing a heat transfer coefficient for the building.

In some embodiments, determining suitability of the building for the retrofit opportunity comprises determining, using the at least one computing device disposed remote from the building and based on an evaluation of the value indicative of the thermal resistivity or thermal capacitance of the building, suitability of an upgrade of building thermal insulation to improve energy efficiency of the building.

In some embodiments, determining suitability of the upgrade of the building thermal insulation comprises simulating, using the at least one computing device, an effect of performance of the upgrade of the building thermal insulation, and estimating, based at least in part on the simulating, one or more second thermal characteristics of the building that would result from the performance of the upgrade of the building thermal simulation.

In some embodiments, computing the one or more thermal characteristics of the building based on the measured thermal data comprises computing, based at least in part on the measured thermal data, a value indicative of an air permeability of the building.

In some embodiments, computing the value indicative of the air permeability of the building comprises computing a convective heat resistance of the building.

In some embodiments, determining suitability of the building for the retrofit opportunity comprises determining, using the at least one computing device disposed remote from the building and based on an evaluation of the value indicative of the air permeability of the building, suitability of sealing of air leaks to improve energy efficiency of the building.

In some embodiments, determining suitability of the sealing of the air leaks comprises: simulating, using the at least one computing device, an effect of performance of the sealing of the air leaks, and estimating, based at least in part on the simulating, one or more second thermal characteristics of the building that would result from the performance of the sealing of the air leaks of the building.

In some embodiments, computing the first one or more thermal characteristics of the building based at least in part on the measured thermal data comprises computing, based at least in part on the measured thermal data, a value indicative of a thermal efficiency of HVAC equipment at the building.

In some embodiments, determining suitability of the building for the retrofit opportunity comprises determining, using the at least one computing device disposed remote from the building and based on an evaluation of the value indicative of the thermal efficiency of the HVAC equipment at the building, suitability of replacement of the HVAC equipment to improve energy efficiency of the building.

In some embodiments, determining suitability of the replacement of the HVAC equipment comprises simulating, using the at least one computing device, an effect of performance of the replacement of the HVAC equipment, and estimating, based at least in part on the simulating, one or more second thermal characteristics of the building that would result from the performance of the replacement of the HVAC equipment at the building.

In some embodiments, computing the one or more thermal characteristics comprises computing the one or more thermal characteristics based on measured thermal data for one or more nighttime periods and not based on measured thermal data for daytime periods.

In some embodiments, computing the one or more thermal characteristics comprises computing a thermal insulation parameter and correlating the thermal insulation parameter with wind data.

In some embodiments, computing the one or more thermal characteristics comprises deriving a closed-form solution of a system of differential equations for the one or more thermal characteristics, and obtaining the one or more thermal characteristics by correlating the closed-form solution with an external ambient variable, and wherein the closed-form solutions comprises a representation of an ambient temperature at the building.

In some embodiments, obtaining the one or more thermal characteristics by correlating the closed-form solution with an external ambient variable comprises obtaining the one or more thermal characteristics by correlating the closed-form solution with a wind data.

In some embodiments, the method further comprises obtaining from the system of differential equations for the one or more thermal characteristics a Taylor expansion of the closed-form solution, the Taylor expansion representing an approximation of the representation of the ambient temperature at the building, and obtaining the one or more thermal characteristics by correlating the Taylor expansion with an external ambient variable.

In some embodiments, obtaining the one or more thermal characteristics by correlating the Taylor expansion with the external ambient variable comprises fitting the Taylor expansion with a function representing an indoor temperature.

In some embodiments, determining suitability of the building for the retrofit opportunity comprises simulating, using the at least one computing device, an effect of performance of the retrofit opportunity on the building, estimating, based at least in part on the simulating, one or more second thermal characteristics of the building that would result from the performance of the retrofit opportunity, and computing, using the at least one computing device, a prospective cost saving by comparing the computed one or more first thermal characteristics of the building with the one or more second thermal characteristics of the housing, and the method further comprises outputting the prospective cost saving for presentation via a user interface.

In some embodiments, the method further comprises receiving, with the at least one computing device, measured thermal data from a communicating thermostat disposed at the building, the measured thermal data comprising the HVAC runtime data; the one or more thermal characteristics of the building are one or more first thermal characteristics of the building; determining suitability of the building for the retrofit opportunity comprises simulating, using the at least one computing device, an effect of performance of the retrofit opportunity on the building; estimating, based at least in part on the simulating, one or more second thermal characteristics of the building that would result from the performance of the retrofit opportunity; and computing, using the at least one computing device, a prospective cost saving by comparing the computed one or more first thermal characteristics of the building with the one or more second thermal characteristics of the housing.

In some embodiments, receiving, with the at least one computing device, the measured thermal data from the communicating thermostat disposed at the building further comprises receiving, with the at least one computing device, data corresponding to an indoor temperature and/or a thermostat set point.

In some embodiments, computing the one or more thermal characteristics of the building based at least in part on the measured thermal data comprises computing, based at least in part on the measured thermal data, a value indicative of a thermal resistivity or thermal capacitance of the building.

In some embodiments, computing the value indicative of the thermal resistivity or thermal capacitance of the building comprises computing a heat transfer coefficient for the building.

In some embodiments, determining suitability of the upgrade of the building thermal insulation comprises, simulating, using the at least one computing device, an effect of performance of the upgrade of the building thermal insulation, and estimating, based at least in part on the simulating, one or more second thermal characteristics of the building that would result from the performance of the upgrade of the building thermal simulation.

In some embodiments, computing the one or more thermal characteristics of the building based on the measured thermal data comprises computing, based at least in part on the measured thermal data, a value indicative of an air permeability of the building.

In some embodiments, computing the value indicative of the air permeability of the building comprises computing a convective heat resistance of the building.

In some embodiments, determining suitability of the building for the retrofit opportunity comprises determining, using the at least one computing device disposed remote from the building and based on an evaluation of the value indicative of the air permeability of the building, suitability of sealing of air leaks to improve energy efficiency of the building.

In some embodiments, determining suitability of the sealing of the air leaks comprises simulating, using the at least one computing device, an effect of performance of the sealing of the air leaks, and estimating, based at least in part on the simulating, one or more second thermal characteristics of the building that would result from the performance of the sealing of the air leaks of the building.

In some embodiments, computing the first one or more thermal characteristics of the building based at least in part on the measured thermal data comprises computing, based at least in part on the measured thermal data, a value indicative of a thermal efficiency of HVAC equipment at the building.

In some embodiments, determining suitability of the replacement of the HVAC equipment comprises simulating, using the at least one computing device, an effect of performance of the replacement of the HVAC equipment, and estimating, based at least in part on the simulating, one or more second thermal characteristics of the building that would result from the performance of the replacement of the HVAC equipment at the building.

In some embodiments, computing the one or more thermal characteristics comprises computing the one or more thermal characteristics based on measured thermal data for one or more nighttime periods and not based on measured thermal data for daytime periods.

Some embodiment are directed to an apparatus comprising at least one processor, and at least one storage medium having encoded thereon executable instructions that, when executed by the at least one processor, cause the at least one processor to perform a method comprising: receiving measured thermal data from a thermostat disposed at the building, the measured thermal data comprising first indoor temperature data associated with the building, computing, based on a mathematical model, second indoor temperature data associated with the building, the mathematical model including one or more thermal characteristics of the building, the one or more thermal characteristic of the building comprising at least one selected from the group consisting of a value indicative of a thermal insulation, a value indicative of an air leakage rate and a value indicative of an heating, ventilation and air conditioning (HVAC) efficiency, down-selecting the first indoor temperature data to one or more periods of low heat transfer; computing the one or more thermal characteristics of the building, wherein the computing comprises fitting the second indoor temperature data with the down-selected first indoor temperature data, and determining suitability of the building for a retrofit opportunity to improve energy efficiency of the building, wherein determining the suitability comprises evaluating the one or more thermal characteristics.

Some embodiments are directed to a method comprising obtaining, using at least one computing device disposed remote from a building, heating, ventilation and air conditioning (HVAC) information indicative of HVAC runtime at the building; selecting a first subset of the HVAC information corresponding to a first time interval characterized at least in part by a first wind speed value, and selecting a second subset of the HVAC information corresponding to a second time interval characterized at least in part by a second wind speed value less than the first wind speed value, wherein the first and second wind speed values represent information relating to wind speed during the first and second time intervals, respectively; computing, using the at least one computing device and based on the first and second subsets of the HVAC information, an air leakage parameter indicative of an air leakage of the building; and determining, using the at least one computing device and based on the air leakage parameter, suitability of the building for a retrofit opportunity to improve energy efficiency of the building.

In some embodiments, obtaining the HVAC information comprises receiving, from a communicating thermostat disposed at the building and using the at least one computing device, temperature data indicative of a temperature at the building; and computing, using the at least one computing device, the HVAC information based on the temperature data.

In some embodiments, obtaining the HVAC information comprises receiving, from a resource consumption meter disposed at the building and using the at least one computing device, resource consumption data; and computing, using the at least one computing device, the HVAC information based on the resource consumption data.

In some embodiments, selecting a first subset of the HVAC information corresponding to a first time interval characterized at least in part by a first wind speed value and selecting a second subset of the HVAC information corresponding to a second time interval characterized at least in part by a second wind speed value comprises selecting the first and second subsets of the HVAC information corresponding to the first and second time intervals being characterized by first and second internal human activity data, respectively, indicative of human activity at the building, wherein the first internal human activity data is within a threshold value of the second internal human activity data.

In some embodiments, selecting a first subset of the HVAC information corresponding to a first time interval characterized at least in part by a first wind speed value and selecting a second subset of the HVAC information corresponding to a second time interval characterized at least in part by a second wind speed value comprises selecting the first and second subsets of the HVAC information corresponding to the first and second time intervals being characterized by first and second solar irradiation data, respectively, wherein the first solar irradiation data is within a threshold value of the second solar irradiation data.

In some embodiments, selecting a first subset of the HVAC information corresponding to a first time interval characterized at least in part by a first wind speed value and selecting a second subset of the HVAC information corresponding to a second time interval characterized at least in part by a second wind speed value comprises selecting the first and second subsets of the HVAC information corresponding, respectively, to the first time interval being defined at a first clock interval and the second time interval being defined at a second clock interval, the first clock interval being within a threshold range of the second clock interval.

In some embodiments, selecting a first subset of the HVAC information corresponding to a first time interval characterized at least in part by a first wind speed value comprises selecting a first subset of the HVAC information in which the first wind speed value is at least 50% of a maximum wind speed value measured throughout a past period of time.

In some embodiments, selecting a first subset of the HVAC information corresponding to a first time interval characterized at least in part by a first wind speed value comprises selecting a first subset of the HVAC information in which an average wind speed exceeds a first wind speed threshold.

In some embodiments, selecting a second subset of the HVAC information corresponding to a second time interval characterized at least in part by a second wind speed value comprises selecting a second subset of the HVAC information in which an average wind speed is less than a second wind speed threshold, the second wind speed threshold being less than the first wind speed threshold.

In some embodiments, selecting a second subset of the HVAC information corresponding to a second time interval characterized at least in part by a second wind speed value comprises selecting a second subset of the HVAC information in which the second wind speed value is less than 10% of a maximum wind speed value measured throughout a past period of time.

In some embodiments, computing, using the at least one computing device and based on the first and second subsets of the HVAC information, the air leakage parameter comprises assuming that a wind effect parameter indicative of a wind effect is within a threshold value of a stack effect parameter indicative of a stack effect.

In some embodiments, computing, using the at least one computing device and based on the first and second subsets of the HVAC information, the air leakage parameter comprises computing an ACH50 parameter, and wherein determining, based on the air leakage parameter, suitability of the building for the retrofit opportunity comprises determining, based on the ACH50 parameter, suitability of the building for the retrofit opportunity.

Some embodiments are directed to an apparatus comprising at least processor; and at least one storage medium having encoded thereon executable instructions that, when executed by the at least one processor, cause the at least one processor to perform a method. The method may comprise obtaining heating, ventilation and air conditioning (HVAC) information indicative of HVAC runtime at a building; selecting a first subset of the HVAC information corresponding to a first time interval characterized at least in part by a first wind speed value, and selecting a second subset of the HVAC information corresponding to a second time interval characterized at least in part by a second wind speed value less than the first wind speed value, wherein the first and second wind speed values represent information relating to wind speed during the first and second time intervals, respectively; computing, based on the first and second subsets of the HVAC information, an air leakage parameter indicative of an air leakage of the building; and determining, based on the air leakage parameter, suitability of the building for a retrofit opportunity to improve energy efficiency of the building.

In some embodiments, obtaining the HVAC information comprises receiving, from a communicating thermostat disposed at the building, temperature data indicative of a temperature at the building; and computing the HVAC information based on the temperature data.

In some embodiments, obtaining the HVAC information comprises receiving resource consumption data from a resource consumption meter disposed at the building; and computing the HVAC information based on the resource consumption data.

In some embodiments, selecting a first subset of the HVAC information corresponding to a first time interval characterized at least in part by a first wind speed value and selecting a second subset of the HVAC information corresponding to a second time interval characterized at least in part by a second wind speed value comprises selecting the first and second subsets of the HVAC information corresponding to the first and second time intervals being characterized by first and second internal human activity data, respectively, indicative of human activity at the building, wherein the first internal human activity data is within a threshold value of the second internal human activity data.

In some embodiments, selecting a first subset of the HVAC information corresponding to a first time interval characterized at least in part by a first wind speed value and selecting a second subset of the HVAC information corresponding to a second time interval characterized at least in part by a second wind speed value comprises selecting the first and second subsets of the HVAC information corresponding to the first and second time intervals being characterized by first and second solar irradiation data, respectively, wherein the first solar irradiation data is within a threshold value of the second solar irradiation data.

In some embodiments, selecting a first subset of the HVAC information corresponding to a first time interval characterized at least in part by a first wind speed value and selecting a second subset of the HVAC information corresponding to a second time interval characterized at least in part by a second wind speed value comprises selecting the first and second subsets of the HVAC information corresponding, respectively, to the first time interval being defined at a first clock interval and the second time interval being defined at a second clock interval, the first clock interval being within a threshold range of the second clock interval.

In some embodiments, selecting a first subset of the HVAC information corresponding to a first time interval characterized at least in part by a first wind speed value comprises selecting a first subset of the HVAC information in which the first wind speed value is at least 50% of a maximum wind speed value measured throughout a past period of time.

In some embodiments, computing, based on the first and second subsets of the HVAC information, the air leakage parameter comprises assuming that a wind effect parameter indicative of a wind effect is within a threshold value of a stack effect parameter indicative of a stack effect.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

Figure 1:
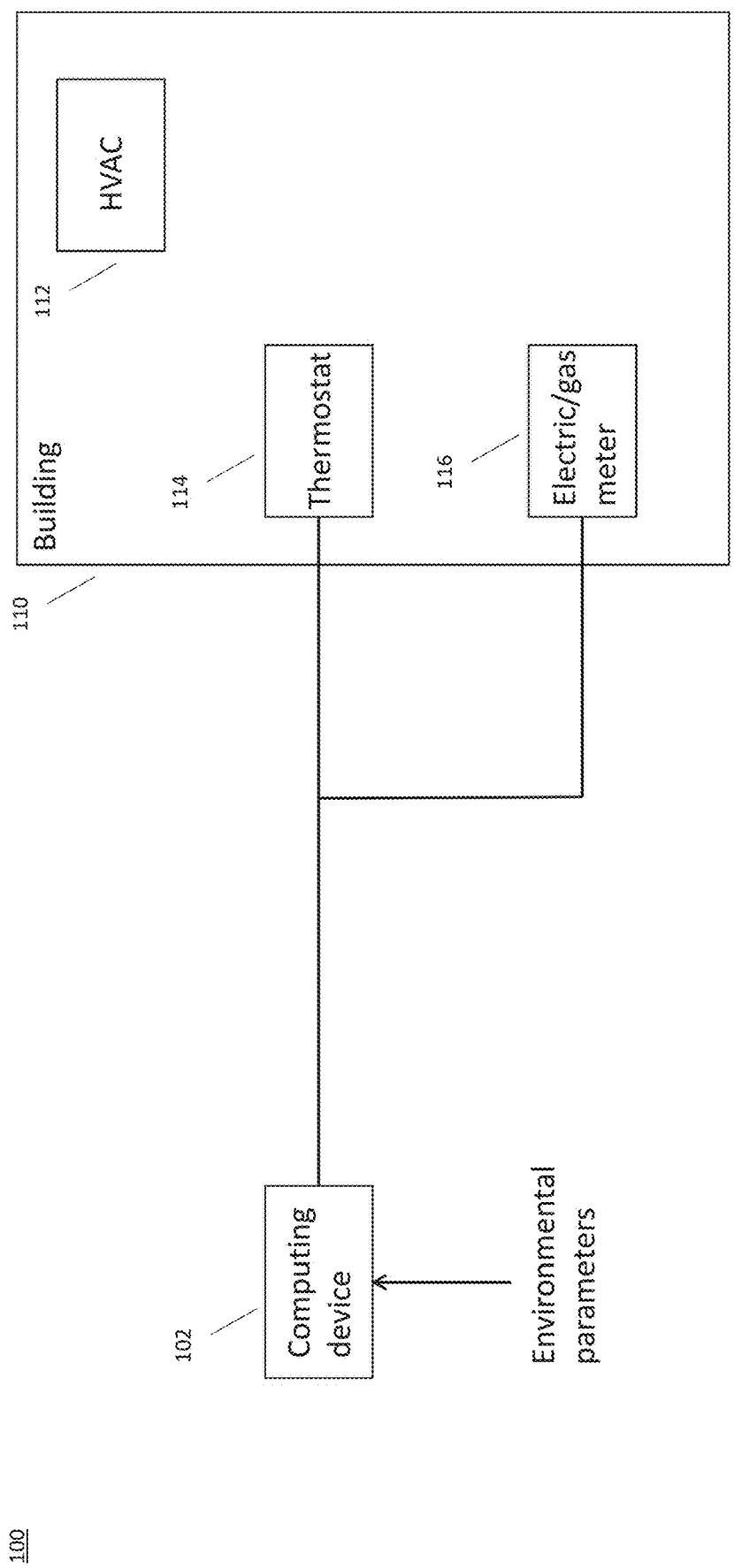
FIG. 1 is a block diagram of a computer system with which some embodiments may operate, including a building and a computing device disposed outside the building and/or remote from the building.

Described herein are embodiments of techniques for determining, remotely from a building, suitability of various retrofit opportunities to improve the energy efficiency of the building. The building may be a residence, a commercial building, an industrial building, or other building. In some embodiments described below, one or more computing devices disposed remote from a building analyze information about the building and, based on that analysis, determine whether any of one or more retrofit opportunities are suitable for improving energy efficiency of the building, such as by determining which of the retrofit opportunities would have a meaningful impact on energy efficiency.

More specifically, described herein are embodiments of a system for analyzing, at one or more computing devices disposed remote from the building, information on usage of heating, ventilation and air conditioning (HVAC) equipment at the building, including the runtime of such HVAC equipment. Such information may be received from equipment disposed at the building, such as equipment that controls operation of the HVAC equipment and/or detects usage of the HVAC equipment. Such HVAC control equipment may include a thermostat. Additionally or alternatively, such information on usage of HVAC equipment may be determined from observing over time resource consumption information for the building, such as information on amounts of electricity and/or gas consumed by the building over time. From an analysis of such resource consumption information, information on usage of HVAC equipment may be determined. Information on usage of HVAC equipment may include information on on/off cycles of the HVAC equipment. Such information on usage of HVAC equipment, such as the information on on/off cycles of the HVAC equipment, may be used to determine suitability to the building of the various retrofit opportunities.

In some embodiments described below, the information on the usage of the HVAC equipment at the building may be used to determine one or more thermal characteristics of the building. Such thermal characteristics may be indicative of a thermal insulation of the building, an air leakage rate of the building and an efficiency of an HVAC system.

Using techniques described below, values for one or more thermal characteristics of the building (including the heat transfer coefficient, the convective heat resistance, and/or the thermal efficiency of HVAC equipment) may be determined by the one or more computing devices disposed remote from the building. More specifically, in some embodiments, the computing device(s) may solve a closed-form system (e.g., a mathematical expression that can be evaluated in a finite number of operations) of differential equations using the HVAC runtime data for the building and, through the closed-form system, determine values for the one or more thermal characteristics of the building.

In addition, through evaluating the one or more values for the one or more thermal characteristics, the computing device(s) disposed remote from the building may determine the suitability of one or more retrofit opportunities for improving an energy efficiency of the building, including through determining which of the retrofit opportunities may meaningfully improve an energy efficiency of the building.

The inventors have recognized and appreciated the advantages that would be offered by a system that remotely determines suitability of different opportunities for retrofit of buildings to improve energy efficiency of the buildings. More specifically, the inventors have recognized and appreciated the limitations of techniques that require on-site inspections of buildings to determine which retrofit opportunities may be suitable for the building. On-site visits may be inconvenient, but also limit the number of buildings that may be evaluated, due to the cost and time required for such on-site inspections. The inventors have recognized and appreciated that that remote audits may be utilized to identify energy improvement opportunities for buildings.

The inventors have further recognized and appreciated that remote audits may be may be performed simply using information on usage of HVAC equipment at a building, which might include digital information transmitted from the building to a computing device disposed remote from the building.

Remote audits will be referred to herein as methods for evaluating the thermal condition of a building that are performed using a system, such as a computer or a server, remotely located from the building (e.g., more than 0.5 miles away, more than 1 mile away, more than 10 miles away or more than 100 miles away). In addition, remote audits may be based on quantitative analyses, rather than mere qualitative inspections, thus improving the effectiveness of the audit. In some embodiments, remote audits may be performed by third parties, such as gas and/or energy utility companies, to evaluate the thermal condition of a building. For example, a remote audit may monitor the state of a building insulation and/or identify the presence of air leaks. Alternatively or additionally, a remote audit may monitor the efficiency of a heating, ventilation and air conditioning (HVAC) system. Based on such evaluations, data-driven opportunities for energy improvements may be identified, including improvement of building insulation, sealing of air leaks and/or replacement of HVAC parts. Improving the thermal efficiency may be of great benefit for the building owner, as it may lead to significant cost savings.

The inventors have recognized and appreciated that an on-site inspection may reveal a range of information about a building, include materials used in the construction of the building, information on a type of HVAC equipment used at the building and/or a condition of the equipment, or other information, and that this information is key in identifying retrofit opportunities for buildings. The inventors have also recognized and appreciated, however, that such information is often unavailable for a remote audit. Accordingly, to perform a remote audit, a remote system must infer characteristics that may drive retrofit decisions, and must infer such characteristics from information that may be available to the remote system. The inventors recognized and appreciated that certain thermal characteristics of a building may be quantitatively derived from HVAC runtime information, and recognized and appreciated how these derivable thermal characteristics may be used in identifying potential retrofit opportunities for buildings.

Accordingly, in some embodiments, the remote system may compute one or more thermal characteristics of a building, such as thermal insulation, air leakage rate and/or HVAC efficiency. Thermal characteristics may be also referred to as "thermal parameters." The system may derive any one of such characteristics from HVAC runtime data associated with the building, alone or together with other information about the building. The HVAC runtime data may include, for example, data referring to the on/off time intervals corresponding to an HVAC system (or multiple such HVAC systems) installed in the building. In some embodiments, such on/off time intervals may be determined through analysis of resource consumption at the building, such as through information on electricity and/or gas usage that are provided by a resource consumption meter (e.g., an electricity meter and/or gas meter) disposed at the building. Based on the derived thermal characteristics, the system may evaluate the suitability of retrofit opportunities for improving the energy efficiency of the building. In some embodiments, the system may estimate prospective cost savings in a scenario in which a retrofit is performed, and may provide these figures to the building owner.

In some embodiments, a system of the type described herein may obtain, from a communicating thermostat, one or more measured thermal data, such as indoor temperature, thermostat set point, and/or HVAC runtime status. Based on such data, the system may compute one or more thermal characteristics associated with the building. For example, the system may compute the heat transfer coefficient, the convective heat resistance, and/or the thermal efficiency of HVAC equipment. Additionally, the system may simulate a scenario in which a retrofit to improve energy efficiency of the building is performed. Examples of retrofits include upgrade of the building thermal insulation, sealing of air leaks and replacement of the HVAC equipment. The system may then compute the one or more thermal characteristics of the building under this simulated scenario. By comparing the simulated scenario with the real scenario, the system may output a prospective cost saving estimate in the case the retrofit considered is actually performed.

Some aspects of the present application provide models for evaluating thermal characteristics of a building. Some such models, also referred to herein as "gray-box models" or "coarse-grained physical-based model" may be designed to compute mathematical closed-form representations of the thermal behavior of a building. A closed-form representation of the type described herein may be fitted to an actual measured thermal curve, and one or more thermal parameters may be obtained. Because the actual values of these thermal parameters may vary by several orders of magnitude, this approach allows for improved accuracies compared to models designed to compute numerical representations.

In some embodiments, a gray-box model may include one or more lumped elements representing physical properties of the building, such as thermal capacitance of the indoor air, area of the external walls, thermal capacitance of the walls, etc., as well as weather data, such as ambient temperature and wind rate. Because such models are designed to output independent parameters for the various thermal characteristics of a building (e.g., building insulation, air leakage and HVAC efficiency), it provides an effective way of determining the most urgent opportunity for building improvement.

Space-heating and cooling loads in residential buildings consume a significant share of primary energy in many developed countries, including the US. Studies suggest that these loads can be significantly reduced by the following three major categories of retrofits: 1) upgrading building insulation (primarily building envelope), 2) improving air sealing, and 3) upgrading HVAC systems.

As the retrofit opportunities vary from home to home, the conventional way to identify home energy improvement opportunities and estimate prospective savings is to perform an on-site home energy audit. These are known to be inconvenient to homeowners, expensive, of inconsistent accuracy (usually only qualitative), and thus fail to scale.

A remote audit that would characterize energy saving opportunities and estimate potential savings with no on-site visit can dramatically improve the conventional practice. The inventors have recognized and appreciated that it would be advantageous if remote audits would utilize data available to the utilities, or obtained from thermostats, to approach customers with retrofit offers that are specifically tailored to their homes, and, at least in some embodiments, provide accurate estimates of the expected energy savings and costs.

One conventional approach to identification of candidate homes for energy retrofits is based on the analysis of monthly energy bills and outdoor temperatures. However, since the bill-based analysis integrates several different physical building parameters (e.g., R-values of exposed surfaces along with their areas, air change per hour, HVAC efficiency), it cannot be directly used to pinpoint a specific energy retrofit opportunity, e.g., replacement of an old HVAC system with a high-efficiency one or attic/wall insulation. For similar reasons, it cannot be used for post-retrofit saving predictions.

Some proposals have been made for using interval data from communicating thermostats (CTs) or smart meter data to identify potential HVAC fault corrections (e.g., filter replacement) or other minor energy consumption adjustments that may be made. Such proposals do not account for identification and characterization of the above-mentioned three major retrofit categories.

The three categories of energy efficiency retrofits may be represented by the following physical home parameters:

U- (or R-) value: Upgrade of building thermal insulation (e.g., wall insulation, window replacement, attic insulation) may be recommended if the current U-value is too high (or R-value is too low).

Air leakage rate: Sealing of air leaks may be recommended if this value is too high (i.e., significant air infiltration detected)

HVAC efficiency: Replacement of HVAC system with a high-efficiency system may be recommended if the estimated efficiency is too low.

Prospective saving due to retrofit(s) can be estimated by the corresponding change in HVAC runtime.

In some embodiments described below, one or more of these parameters may be derived from the HVAC runtime data, which, in turn, can be disaggregated from the household interval meter, either a gas meter or electricity meter or from data obtained from a communicating thermostat (e.g., indoor temperature, thermostat set point, HVAC status: running or not). Alternatively, or additionally, HVAC runtime data may be provided by a communicating thermostat (CT) disposed at the building. Some embodiments leverage a class of parametric coarse-grained yet physics-based models for this purpose. These models may include one or several lumped elements representing such physical elements as, e.g., external walls, room air, or HVAC system, so that these models correspond to grey-box models of buildings.

Predictive models for building thermal response can be divided into white-box, gray-box, and black-box categories.

White-box models are very detailed and accurate physics-based simulation tools. Since they typically require hundreds of parameters to describe a single building, both setting up the model and estimation of its parameters from experimental data to characterize the retrofit opportunities are time-consuming and, sometimes, ill-posed tasks, making the white-box models difficult to scale.

Black-box models rely on large training data sets and machine learning techniques to estimate building physical parameters and/or classify buildings by their retrofit opportunities. Because these models do not have a physical basis, their predictive ability is limited and restricted to homes whose characteristics are represented by those in the training data set. Because of their simplicity, these models can scale fairly easily, but only if appropriate and large training data sets exist.

Grey-box models may use relatively coarse-grained physical models (typically, lumped models) with just a few parameters. Although these models seem to combine the advantages of the other two model categories (i.e., physics-based predictive ability of the white-box models and the scalability of the black-box models), they are inherently coarse so that the estimated building parameters may not precisely match the actual physical building parameters.

In some embodiments, a gray-box model of a single-family home with a thermostat-controlled HVAC unit is provided. Under certain limiting conditions, the model can be applied to interval electricity- or gas-consumption household data to relate HVAC runtime to the outside temperature and estimate the lumped yet physics-based model parameters that can quantitatively characterize retrofit opportunities and savings.

Some specific embodiments are directed to methods for determining the air leakage rate of a building, and accordingly, for determining suitability of sealing of air leaks to improve the energy efficiency of a building. Air leakage arises when air infiltrates through the envelope of a building, and may result, for example, due to the presence of holes, cracks, interstices or other openings in a building. Air leakage can give rise to convective heat transfer, whereby heat is transferred from one place (e.g., outside the building) to another (e.g., inside the building) by the movement of air, which in turn can cause changes in the temperature inside the building. Depending on the temperature of the mass of air, the indoor temperature may increase or decrease when air leakage occurs.

Air leakage rate is a physical parameter of a building, based on the nature of the building's construction or maintenance, and impacted by the structure of the building and its components. Air leakage rate is a quantity indicative of the volumetric flow of air into a building per unit time. Accordingly, air leakage rate may be expressed in units of cubic feet per minute, or liters per second, among other possibilities.

Conventional approaches to determining air leakage rate have focused on visiting a building to perform physical tests of the building. Typically, measurements of air leakage rates in buildings involve blower door tests, in which a machine—a blower door—is used to measure air tightness of the buildings. Blower doors include fans for blowing air into or out of the building, which create either a positive or negative pressure differential between inside and outside of the building. This pressure difference forces air through all holes and penetrations in the building envelope. When the building is "tighter" (e.g., when the building has fewer and/or smaller holes), a smaller amount of air pressure is needed from the blower door fan to create a change in building pressure.

The inventors recognized and appreciated that there are disadvantages to these conventional methods of determining air leakage. The machines must be brought to buildings to be tested, and operated by trained operators. Having to visit the building with the equipment, and needing trained personnel, increases the expense of conducting the tests. These factors additionally limit the number of tests that can be conducted at any time, based on availability of the equipment and personnel.

The inventors recognized and appreciated that it would be advantageous if an air leakage rate of a building could be determined remotely, without needing to perform on-site visits with specialized equipment or personnel. Based on the physical nature of air leakage rate, as discussed above, conventional methods focused on on-site visits and physical testing of a building. The inventors recognized and appreciated, however, that information on the physical properties of a building may be derivable through specific analyses that may be performed on specific information, and/or specific combinations of information, that is collected about a building at specific times.

Contrary to on-site blower door tests, techniques described herein enable the determination of air leakage rates or other parameters indicative or air leakage without the need for sophisticated machines or without having to perform on-site visits. In some embodiments, air leakage rates may be determined by combining mathematical models representing the thermal behavior of a building with HVAC runtime data representing the status (e.g., on or off), over a certain period of time, of HVAC systems installed at the building. As described above, HVAC runtime data can be inferred from temperature data obtained from a communicating thermostat disposed at the building or from resource consumption data obtained from a resource consumption meter (e.g., electricity and/or gas meter).

The inventors also recognized and appreciated, though, that there are challenges to determining an air leakage rate from HVAC information, as there is not a direct relationship between air leakage and changes in HVAC system status. For example, changes in the status of an HVAC system at a building can be attributed not only to air leakage, but also to other different effects, including internal human activity, variations in the differential between external and internal temperature, and solar irradiation. This in turn frustrates the determination of air leakage rates from HVAC runtime data.

The inventors have recognized and appreciated, however, that air leakage rate may be determined by isolating changes in the status of an HVAC system that can be attributed to air leakage. This can be performed, in some embodiments, by isolating subsets of the HVAC runtime information that are associated with time intervals selected such that, except for changes in wind speed, the internal and external conditions stay substantially the same across the different intervals. In some embodiments, the identification of time intervals may be based on an evaluation of candidate matching time intervals to determine a set (e.g., a pair) of time intervals in which one, two, or more parameters that describe environmental conditions during the time intervals match. Matching time intervals may be determined by evaluating parameters in the intervals to identify intervals in which one or more of the parameters are identical and/or are substantially equal (e.g., are within a threshold value of one another). Examples of parameters that may be considered to match time intervals include, but are not limited to, time of day, solar irradiation, internal human activity and temperature differential (e.g., between the temperature inside a building and the temperature outside the building).

Two intervals may be matched, for example, if they are defined within the same times of day or if they are defined within clock intervals that are within a threshold value of each other. Additionally, or alternatively, two intervals may be matched if they share substantially the same solar irradiation. Solar irradiation data may be obtained for example using sensor(s) disposed in proximity to a building or using public databases including solar irradiation data at the location of interest. Additionally, or alternatively, two intervals may be matched if they share substantially the same internal human activity. Internal human activity may increase the indoor temperature of a building, and may therefore introduce an additional variable to the model. Different quantities may be used to represent human activity including for example data obtained from motion sensors installed inside the building.

More particularly, to isolate the impact of air leakage, time intervals may be selected that have substantially the same conditions (e.g., as described above, time intervals within a threshold value of each other, or environmental parameters like solar irradiation data or human activity within a threshold value of each other), but different wind speeds. Wind speed may affect air leakage in that larger wind speeds can lead to a greater mass of air infiltrating through the envelope of a building. It should be appreciated that any suitable value derived from wind speed data may be used for purposes of matching time intervals, including for example average wind speed over an interval, mean wind speed over an interval, root mean square wind speed over an interval, peak wind speed over an interval, or any other suitable value.

Matching of time intervals that have different wind speeds may be performed in any suitable way. In some embodiments, time intervals may be matched if the respective quantities representing wind speed (e.g., average value, peak value or other values derived from wind speed data) are separated from each other by at least a threshold value. Threshold values may be defined in terms of absolute values or in terms of percentage. In one example, a first interval is selected in which the wind speed is within a threshold value of the maximum wind speed over a past period and a second interval is selected in which the wind speed is within a threshold value if the minimum wind speed over the past period (or another period). Considering values close to the maximum and the minimum observed in a period may magnify the impact of air leakage on HVAC runtime data, thus enhancing the ability to determine air leakage parameters. Of course, other values for the wind speed may be selected, as described in detail further below.

In one specific example, two time intervals may be selected in which the difference between external and internal temperature, solar irradiation and internal human activity are substantially unchanged, but the average wind speed is 1 m/s during the first time interval and is 15 m/s during the second time interval. A first data subset is then obtained by isolating the HVAC runtime data associated with the first time interval and a second data subset is obtained by isolating the HVAC runtime data associated with the second time interval. Because the underlying conditions are substantially the same between the two intervals (other than different wind speeds), and because the extent to which air infiltrates through the envelope of the building may depend on wind speed, it can be inferred that differences between the first and second data subsets can be attributed to air leakage.

System of the types described herein may in some embodiments collect data for each time interval and for each parameter in the time interval, and base selection of matching time intervals based on evaluation of that collected data. In other embodiments, though, the system may omit collection of data on one or more of the parameters for a time interval, and may instead be configured with assumptions about values of one or more parameters during a time of day or time of year at which the time interval falls. The system may be configured with information on parameters during different time intervals and such information may be determined from testing or may be based on assumptions from an administrator. For example, during daytime hours solar irradiation may vary depending on the weather, but solar irradiation levels may be the determined to be or assumed to be low during nighttime hours, regardless of weather. Accordingly, rather than collecting data on solar irradiation during a nighttime time interval, the system may presume that the solar irradiation is low at that time. Similarly, rather than collecting data on internal human activity during a nighttime time interval, the system may presume that the human activity in a building is low at that time. The system may, in some embodiments, evaluate assumed values for such parameters in determining matching time intervals. In other embodiments, the system may only consider time intervals in which some parameters are known or assumed to be identical, and thus may not need to explicitly account for these parameters in selecting matching time intervals. For example, the system may only collect data for parameters for time intervals that occur during time intervals where other parameters are known to have consistent values, such that data need not be collected for other parameters.

To further improve the accuracy of the air leakage parameter estimates, in some embodiments, the parameters obtained for multiple time intervals obtained over several days (e.g., more than fifty or more than one hundred days) may be combined. For example, values may be derived for multiple time intervals that are reflective of the set of time intervals. The derivation of the values may be performed through statistical analysis, such as through averaging. Accordingly, the average value of a parameter may be determined over multiple time intervals sharing similar characteristics (e.g., having substantially the same solar irradiation or human activity). It should be appreciated that the data obtained over different time intervals may be combined in any suitable ways, averaging being only one example. When data sets are combined over multiple time intervals, variations in the conditions surrounding the measurements may be filtered out.

Some embodiments relate to techniques for determining suitability of various retrofit opportunities to improve the energy efficiency of the building. More specifically, some embodiments relate to techniques for determining suitability of sealing of air leaks in a building to improve the energy efficiency of the building.

In one illustrative embodiment, HVAC information indicative of HVAC runtime at a building may be obtained using a computing device disposed remote from the building. To isolate meaningful information relating to air leakage, first and second subsets of the HVAC information may be selected. The first subset may correspond to a first time interval characterized by a first wind speed value, and the second subset may correspond to a second time interval characterized by a second wind speed value (different from the first wind speed value). The first and second wind speed values represent information relating to wind speed (e.g., average wind speed, mean wind speed, root mean square wind speed, peak wind speed, minimum wind speed, or other quantities derived from wind speed measurements) during the first and second time intervals, respectively. In some circumstances, the first and second time intervals may be further characterized by substantially the same conditions (e.g., such that the respective clock intervals are within a threshold value of each other, the respective solar irradiation data are within a threshold value of each other, and/or the respective internal human activity data are within a threshold value of each other). One or more air leakage parameters indicative of the air leakage at the building may be computed based on the first and second subsets of the HVAC information. Examples of air leakage parameters that may be computed include air leakage rate, ACH50, wind effect parameter and stack effect parameter. Suitability of the building for a retrofit opportunity (e.g., sealing of air leakage) to improve energy efficiency of the building may be determined based on the air leakage parameter. For example, it may be determined that sealing of air leakage is appropriate if the air leakage parameter is greater than a certain threshold value.

Some embodiments described below may include one or more of:

A. Closed-form solution and/or approximations to the underlying differential equations. Using the closed-form solution along with its approximation for relatively small HVAC runtime may allow direct estimation of retrofit parameters with now curve-fitting involved. The approximations may also help reduce necessity of additional building data as only building volume to area ratio may be needed. Using the closed-form solution may improve the parameter estimation since the "theoretical" curve (i.e., the closed-form solution) is fitted to the experimental curve (i.e., communicating thermostat data, e.g., indoor temperature) to identify the parameter estimates that yield the best fit. In the conventional approach, the differential equations are solved numerically with their parameters being simultaneously estimated, which significantly increases the estimation uncertainty.

B. Restricting data to periods of time with low heat transfer, such as periods of low activity and/or periods of low external irradiation (e.g., nighttime). Human activities along with such effects as solar-induced heat gains can disturb the grey-box model equations, even though these effects can be modeled, as explained below. Accordingly, in some embodiments it is proposed to use restricted data for initial estimation of basic equation parameters. In some embodiments, data are restricted to time intervals in which human activity inside the building is lower than average. For example, data may be restricted to nighttime (e.g., between 11 pm and 6 am), a work-day period (e.g., between 9 am and 5 pm) for a residential home, or to other time intervals in which low human activity is expected. Additionally or alternatively, data are restricted to times having low external irradiation (e.g., irradiation due to the sun or other sources of heat outside the building), which may include night times or other times at which irradiation would be low. "Low" external irradiation may be determined to be times at which irradiation is below a threshold, where the threshold may be set based on an impact the external irradiation would have on heat gains within the building. External irradiation may be lowest at night, but in some cases, other periods of suitably low external irradiation may be determined to be dawn or dusk, or times corresponding to certain weather patterns local to the building such as thick cloud cover. Accordingly, in some embodiments, data for periods of low activity and/or low external irradiation may be used, and in some such embodiments data for night may be used.

C. Wind data for infiltration modeling. Direct separation of insulation and infiltration components in grey-box models may be difficult in some embodiments. The wind data can be used to correlate wind speed with the estimated coupled U-value (that includes the infiltration component) and, ultimately, to separate the insulation resistance from infiltration resistance.

D. Optimization-based approach for HVAC runtime disaggregation. A typical time resolution of interval meters ranges from 15 min (electric meters) to 1 h (gas meters). However, the duration of time on or off needs to have a higher accuracy. It is proposed here to estimate the runtimes by matching synthetic and actual interval meter data over periods of low human activity and/or periods of low external irradiation (such as nighttime). In this way, single values for time on and time off for each period of low activity/irradiation, but with correspondingly increased precision, are obtained.

E. Coupling with Machine-Learning (ML) techniques. To estimate HVAC efficiency and to make saving predictions, unrestricted in time CT data may be used. Once the basic model parameters are estimated on the basis of the restricted data (e.g., nighttime data), the additional (unknown) heat losses/gains attributable, e.g., to human activities or weather effects can be estimated for arbitrary time for a home under question. These estimated loads can then be correlated with such data as time of the day/day of the week and weather using ML techniques. In this way, modeling and prediction of these loads gets more accurate than modeling by generic theoretical models of occupancy or solar radiation, since it may be tailored directly to a given home. Examples of ML techniques are artificial neural network, transfer function, process models, state-space models and autoregressive models, although this list is not limited to these techniques.

F. Using approximated correlations to get bounds for the parameters of interest to be subsequently estimated either per A, or by solving differential equations of grey box model numerically. Both brute-force estimation techniques (i.e., estimation by curve fitting using the closed-form solution to the differential equations, or estimation by numerical solving of differential equations) are mathematically ill-posed problems. Moreover, the proposed use of "local" restricted data (e.g., data from a single night) may result in the overfitting problem. Approximate correlations that use larger sets of data for a given home, can provide boundaries for the "global" solution for the parameter estimates or their combinations. The "local" estimation techniques, restricted with these bounds, can then provide an accurate "global" solution for the estimated parameters.

Figure 2:
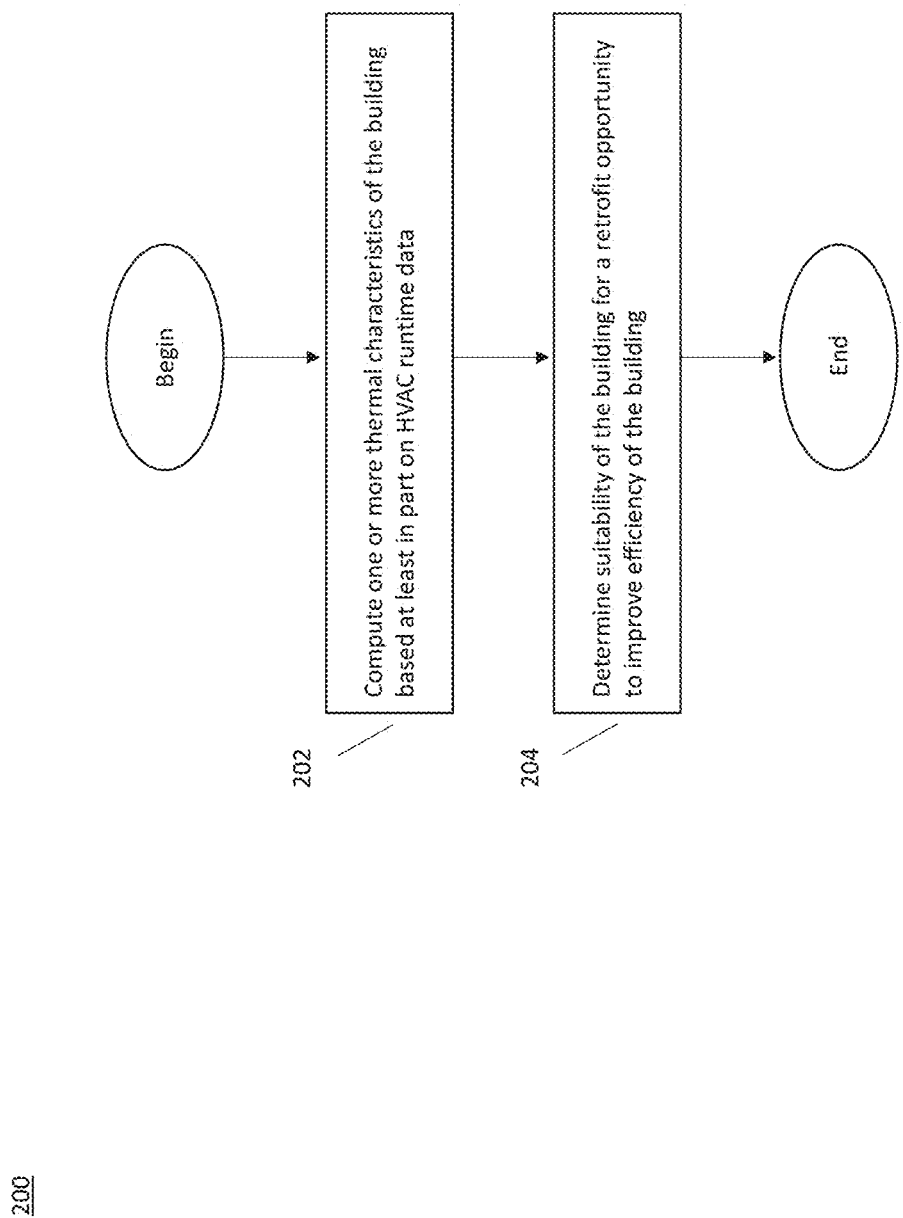
FIG. 2 is a flowchart illustrating a process for determining suitability of a retrofit opportunity for a building, in accordance with some embodiments.

FIG. 1 and FIG. 2 are diagrams illustrating respectively a system and a process for determining suitability of a building for a retrofit opportunity to improve energy efficiency of the building, in accordance with some embodiments. As illustrated, computing device 102 may be remote from building 104 (e.g., more than 0.5 miles away, more than 1 mile away, more than 10 miles away or more than 100 miles away). Building 110 may be a residential building, a commercial building, an industrial building, or any other type of building. Computing device 102 may analyze information about building 110 and, based on the analysis, determine whether any of one or more retrofit opportunities are suitable for improving energy efficiency of building 110, such as by determining which of the retrofit opportunities would have a meaningful impact on energy efficiency.

Building 110 may include an HVAC unit 112 and thermostat 114, and additionally or alternatively, electric/gas meter 116. Thermostat 114 (also referred to herein as a "communicating thermostat") may be used to control HVAC 112, and may include sensors for detecting one or more measured thermal data, such as indoor temperature. Thermostat 114 may be programed with a temperature set point for setting a desired temperature inside building 110.

Based on the set point, HVAC 112 may be turned on or off. Electric/gas meter 116 may monitor electricity and/or gas consumption of building 110. In some embodiments, electric/gas meter 116 samples electricity consumption with a 15 min resolution and gas consumption with a 1 h resolution. Of course, other time resolutions are also possible.

Computing device 102 may receive data from thermostat 114, such as indoor temperature, set point, and HVAC runtime data (e.g., on/off cycles for HVAC 112) and/or electricity and/or gas consumption from electric/gas meter 116. In at least some of the embodiments in which electricity and/or gas consumption data are received by computing device 102, information on usage of HVAC may be determined from an analysis of such resource consumption. The information on the usage of the HVAC equipment, whether obtained via thermostat 114 or electric/gas meter 116, may be used to determine one or more thermal characteristics of the building (act 202 of method 200). Non-limiting examples of such thermal characteristics include a thermal insulation of building 110, an air leakage rate and/or the thermal efficiency of HVAC 112. In some embodiments, computing device 102 may determine values for the one or more thermal characteristics of the building using a mathematical framework for the thermal behavior of the building (e.g., a closed-form system of differential equations) using the HVAC runtime data for the building. Based on the computed thermal characteristics, computing device 102 may determine the suitability of one or more retrofit opportunities for improving an energy efficiency of the building, including determining which of the retrofit opportunities may meaningfully improve an energy efficiency of the building (act 204 of process 200). In some embodiments, a notification may be sent to an agent (e.g., the building owner or a tenant) laying out the recommendation. The notification may be sent in any of numerous ways, including via mail, email, telephone, or by sending a salesperson to recommend the retrofit. In some embodiments, a retrofit to the building may be made consistent with the recommendation.

Figure 3:
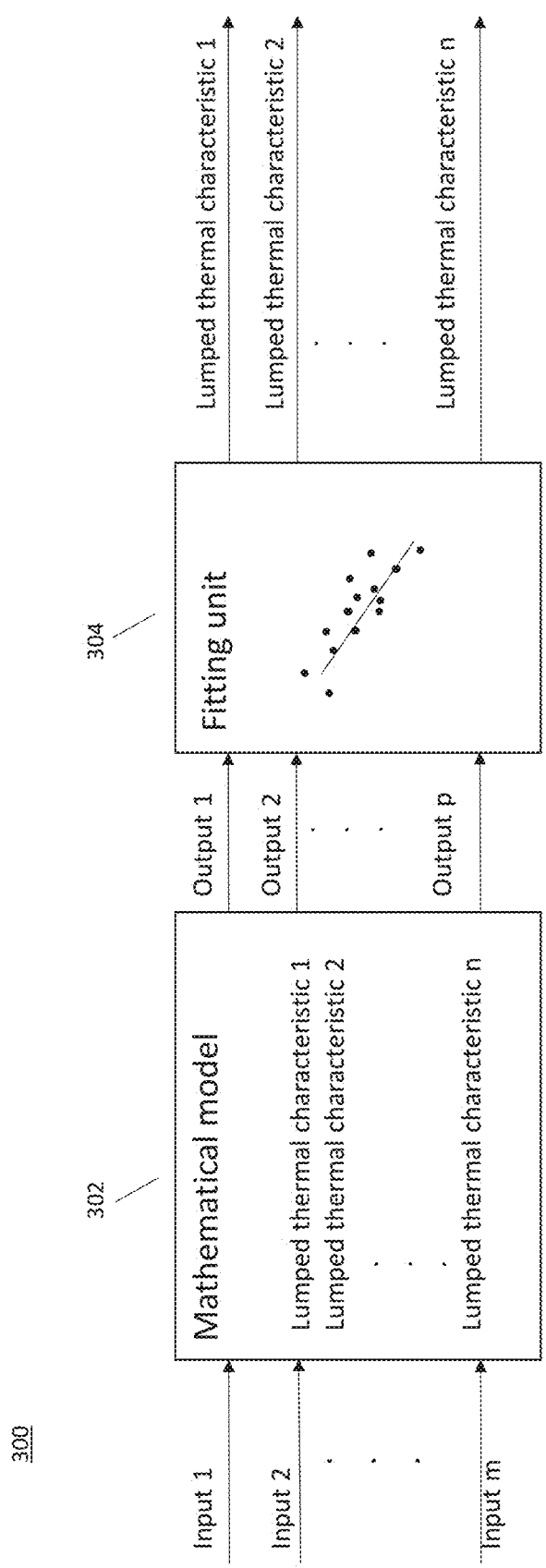
FIG. 3 is a block diagram illustrating an example of a mathematical framework that may be executed by the computing device of FIG. 1, in accordance with some embodiments.

An example of a mathematical framework for determining one or more thermal characteristics of building 110 is depicted in FIG. 3. As illustrated, at least two steps may be performed as part of mathematical framework 300. First, a mathematical model 302 may be used to represent the thermal behavior of the building. Mathematical model 302 may include, at least in some embodiments, one or more differential equations representing the thermal behavior of the building, and may provide output 1, output 2 ... output p when input 1, input 2 ... input m are provided. In some embodiments, mathematical model 302 may include one or more lumped thermal characteristics of the buildings for modeling different aspects of the thermal behavior of the building, such as the thermal insulation, the air leakage rate and the thermal efficiency of the HVAC system. In this example, mathematical model 302 includes lumped characteristics 1, 2 ... n. It should be appreciated, that, at least in some embodiments, the thermal characteristics of the building may not be known a priori.

Fitting unit 304 may be used to determine, at least in some embodiments, some or all of the lumped thermal characteristics of mathematical model 302. In some embodiments, fitting unit 304 receives the outputs computed using mathematical model 302 and compares these outputs with measured quantities, which may be obtained, at least in some embodiments, using a thermostat disposed at the building. In one example, the outputs of the mathematical model may be fitted to the measured quantities by adjusting the lumped thermal characteristics. The fitting operation may be iterative, and may be repeated until the outputs of the mathematical model substantially match the measured quantities. In this way, lumped thermal characteristics 1, 2 ... n may be determined.

Examples of inputs include, but are not limited to, the area of the walls of the building and the outdoor temperature. Examples of lumped thermal characteristics include, but are not limited to, the thermal capacitance of the indoor air, the thermal capacitance of the walls, the heat loss/gain due to the external walls, the heat loss/gain dissipated/generated inside the building, the HVAC energy consumption rate, the heat transfer coefficient of the walls (which may represent the thermal insulation of the building), the convective heat resistance (which may represent the air leakage), and the thermal efficiency of the HVAC. Examples of outputs include, but are not limited to, the indoor temperature, the temperature of the walls and the duration of time when the HVAC system is turned on and/or turned off.

In one specific example, the time duration when the HVAC system is on/off obtained using mathematical model 302 may be fitted to a measured on/off time duration of the HVAC system to obtain one or more lumped parameters. As described herein, the measured on/off time duration of the HVAC system ($t_{on/off}$) may be obtained from thermostat data and/or may be inferred from electric/gas meter data.

In some embodiments, the heat transfer coefficient of the walls, the convective heat resistance and the thermal efficiency of the HVAC may be determined using mathematical framework 300. Based on the value obtained for the heat transfer coefficient of the walls, it may be determined whether an upgrade in the thermal insulation of the building is appropriate. Based on the value obtained for the convective heat resistance, it may be determined whether sealing of air leaks is appropriate. Based on the value obtained for the thermal efficiency of the HVAC, it may be determined whether replacement of the HVAC system (or at least a part of the HVAC system) is appropriate.

In some embodiments, estimation of the thermal characteristics of the building may be computed by fitting indoor temperature obtained using mathematical model 302 with indoor temperature measured with a communicating thermostat, such as thermostat 114.

I. Example of Mathematical Framework Using Resource Consumption Information

An example of mathematical framework 300 that may be used in connection with electric/gas meter data uses differential equations for the temperature of the air in the building ($T_r$) and the temperature of the walls ($T_w$) as a function of time.

In one embodiment, the considered system includes a single lumped wall that models all actual building external walls, a basement and a roof and an additional lumped resistive element modeling air infiltration. The model may have two capacitances (indoor air and lumped wall) and two resistances (lumped wall and convection infiltration). As such, the model may be viewed as an R2C2 grey box model. Unlike an electrical-analogy based grey box model balance differential equations may be used to model this system mathematically:

$$C_r \frac{dT_r}{dt} = U_w A_w (T_w - T_r) + L(T_a - T_r) + \eta q^* + q_{int} \quad (1)$$

$$C_w \frac{dT_w}{dt} = U_w A_w (T_r - T_w) + U_w A_w (T_a - T_w) + q_{ext} \quad (2)$$

In Eqs. (1)-(2), $C_r$ is overall thermal capacitance of the indoor air (and optionally of furniture appliances and/or internal walls), $U_w$ and $A_w$ are U-value (representing the thermal insulation) and area of the walls (i.e., building envelope), $C_w$ is overall thermal capacitance of the walls, $q^*$ is energy consumption rate related to HVAC system (positive for heating, negative for cooling and zero for off-state), $\eta$ is the thermal efficiency of the HVAC system, $q_{int}$ is the internal household heat gains/losses (e.g., due to solar gains, non-HVAC appliances, window openings), qext is heat gains/losses due to generation/dissipation outside the building (e.g., due to solar gains), L is the convective heat resistance that models air infiltration by a mathematical function, and Ta is the outdoor temperature.

The closed-form solution to Eqs. (1-2) is given by $$T_r(t) = a + b\exp(-s_1 t) + c\exp(-s_2 t) \quad (3)$$

where $$a = T_a + \frac{2q}{\alpha + 2\beta} \quad (4)$$

$$b = \frac{1}{\sqrt{D}} \left\{ \frac{\alpha + \beta + 2\gamma}{\alpha + 2\beta} [\alpha T_a + 2(q + \beta T_a)] - 2\gamma T r(0) - \right.$$

$$\left. \alpha T_w(0) - q - \beta T_a + T_r(0) s_1 - \frac{\alpha T_a + 2(q + \beta T_a)}{\alpha + 2\beta} s_1 \right\}$$

$$c = T_r(0) - b - c$$

$$s_{1,2} = \frac{\alpha + \beta + 2\gamma \pm \sqrt{D}}{2}, \; D = \alpha^2 + \beta^2 + 4\gamma^2 + 2\alpha\beta - 4\beta\gamma \quad (5)$$

$$\alpha = \frac{U_w A_w}{C_r} \quad (6)$$

$$\beta = \frac{L}{C_r}$$

$$\gamma = \frac{U_w A_w}{C_w}$$

$$q = \frac{\eta q^* + q_{int}}{C_r}$$

Example of Approximated Parameter Derivation

A thermostat-controlled HVAC system cycles between its on and off states depending on the indoor temperature as measured by a thermostat. Usually, the on state is initiated as soon as the temperature deviates by more than ΔT (thermostat deadband) from the temperature set point. The duration of the on state is determined by the time the HVAC needs to exceed the set point by ΔT. For example, with a set point of 70° F. and deadband of 1° F., HVAC in heating season starts once the temperature decreases to 69° F. and stops when it reaches 71° F. Assuming the times on and off to be relatively small (e.g., $s_{1,2} \cdot t_{on/off} \ll 1$) and also assuming constant ambient conditions during such short periods of time, a two-term Taylor expansion may be used to get the following linear approximation for time on (or off) duration from Eq. (3):

$$\frac{1}{t_{on/off}} \approx -\frac{bs_1 + cs_2}{\Delta T} \quad (7)$$

Eqs. (4) and (5) suggest that the inverse of the time duration $T_{on/off}$, is linearly proportional to the ambient temperature. Assuming that the initial wall temperature for such short on-off cycles is close to the steady state temperature, the following linear dependence may be obtained for the slope:

$$\left| Slope_{t_{on/off} vs T_a} \right| \approx \frac{\alpha + 2\beta}{2\Delta T} \quad (8)$$

For the intercept of the tangent line, Eq. (7), with the temperature axis (corresponding to $t_{on/off} \to \infty$), the following expression is obtained:

$$(T_r(0) - T_{a,inter}) \frac{\alpha + 2\beta}{2} - q = 0, \quad (9)$$

where $T_{a,inter}$ is the intercept point on the ambient temperature axis.

As discussed above, the air leakage expressed by variables L and β can correlate with wind speed (over a certain wind direction). Accordingly, if data that correspond to low wind speeds is selected, β in Eqs. (8) and (9) can be neglected. Finally, the following expression is obtained (in SI units)

$$U_w = \frac{2\Delta T \cdot C_r |Slope|}{A_w} = \frac{2.58 \cdot 10^3 \Delta T \cdot V |Slope|}{A_w}, \quad (10)$$

where V is building volume and $$C_r = V \cdot 1.29 [kg/m^3] \cdot 1000 [J/kg \cdot K] \quad (11)$$

The balance point is essentially the intercept for the time-off regression:

$$T_r(0) = T_{a,inter,off} \quad (12)$$

and the effective power of cooling/heating is given by $$\eta q^* = (T_{a,inter,on} - T_{a,inter,off})\frac{\alpha + 2\beta}{2}C_r, \quad (13)$$

which, for the low-wind filtered data may be expressed as:

$$\eta q^* = (T_{a,inter,on} - T_{a,inter,off})|\text{Slope}|\Delta T \cdot V \cdot 1.29 \cdot 10^3 \quad (14)$$

To get HVAC efficiency η, the energy consumption rate (q*) can be obtained from disaggregation (for interval gas data or for ACs and interval electric data) or calculated using HVAC energy estimated from household monthly energy consumptions by PRISM method, divided by the HVAC on-time (available from CT).

The infiltration can then be estimated by correlation of the estimates of U-value obtained for time on/off data corresponding to small ranges of wind speed, to wind speed values. It should be appreciated that more advanced models for the infiltration may comprise not only the wind-related infiltration but also the stack effect. Simple correlations for parameter derivations under these models are also possible (As described below). Also, it should be appreciated that Eq. (14) may provide a mathematical description of the U-value wind speed correlations.

It should be appreciated that the invention is not limited to the two-term Taylor expansion. Other approximations can be used to convert the closed-form solution of the grey-box model to an algebraic equation. Likewise, more complex grey-box models than the considered second-order model can be used.

Air Leakage

Some embodiments are directed to methods for determining the air leakage of a building, and accordingly, for determining suitability of sealing of air leaks to improve the energy efficiency of a building. Air leakage arises when air infiltrates through the envelope of a building, and may result, for example, due to the presence of holes, cracks, interstices or other openings in a building. The extent to which a building is subject to air leakage can be expressed in terms of air leakage rate. Of course, other parameters indicative of the air leakage of a building may additional or alternatively be used. The techniques described herein for determining the air leakage of a building do not need on-site visits, though on-site visits may be performed in parallel to the techniques described herein in some circumstances.

In some embodiments, air leakage rates may be determined by combining mathematical models representing the thermal behavior of a building with HVAC runtime data representing the status (e.g., on or off), over a certain period of time, of HVAC systems installed at the building. An example of a mathematical model has been described above in connection with Eps. (1-2), where the term L(Ta−Tr) represents the air infiltration. A more accurate and advanced infiltration model that accounts for both wind and stack effects suggests a specific form for L in Eq. (1):

$$L = \sqrt{C_{wind}w^{2.6} + C_T(|T_a - T_r|)^{1.3}} \quad (15)$$

where $C_{wind}$ and $C_T$ are parameters, Ta is the outdoor temperature, Tr is the indoor temperature, and w is the wind speed. $C_{wind}$ is a parameter indicative of the wind effect. The wind effect is referred to herein as the phenomenon whereby the extent of the infiltration is wind-dependent. $C_T$ is a constant indicative of the stack effect. The stack effect is a phenomenon that results from air buoyancy, which occurs due to a difference in indoor-to-outdoor air density resulting from temperature and moisture differences. The stack effect is independent from the wind. In some embodiments, due to the physical independence of the wind and stack effects, other potential expressions of the infiltration may include a sum of a wind-dependent component and a temperature-dependent component.

In principle, for homes with moderate to high air sealing, the infiltration portion of energy in Eq. (1) and its mathematical solution is small (<10%) as compared to the energy spent on heat conduction through wall. For such homes, all previous approximations are valid. However, for homes with high air infiltration, other approximated correlations are needed since Eq. (15) makes Eq. (1) non-linear. In such circumstances, eqs. (1)-(2) may be solved numerically.

To address this problem, in some embodiments, a first-order formulation of Eqs. (1)-(2) and (15) may be used $$C_r \frac{dT_r}{dt} = U_w A_w (T_a - T_r) + \sqrt{C_{wind}w^{2.6} + C_T(|T_a - T_r|)^{1.3}}(T_a - T_r) + \eta q^* + q_{int} \quad (16)$$

This formulation is a valid approximation of the second-order model Eqs. (1)-(2) to relatively short periods of time on and low activity data. For the low activity data the last term in Eq. (16) can be neglected; moreover, for the relatively short periods of time on, the following linearization can be applied:

$$C_r \frac{\Delta T}{t_{on}} = U_w A_w (T_a - T_r) + \sqrt{C_{wind}w^{2.6} + C_T(|T_a - T_r|_r)^{1.3}}(T_a - T_r) + \eta q^* \quad (17)$$

In the quasi steady-state for the low activity data, Eq. (16) takes the following form:

$$0 = U_w A_w (T_a - T_r) + \sqrt{C_{wind}w^{2.6} + C_T(|T_a - T_r|_r)^{1.3}}(T_a - T_r) + \frac{\sum t_{on}}{t_{low\_activity}}\eta q^* \quad (18)$$

where $\Sigma t_{on}$ is the total time on and the duration of a period of low activity is $t_{low\_activity}$ (typically the night, such as from 12 am to 5 am) and ambient/indoor temperatures are approximated to be constant over a given period of low activity. While Equation 18 is described using periods of low human activity, it should be appreciated from the foregoing that a time of low external irradiation, or a period of low human activity and low external irradiation (e.g., night) may be used. In various examples below, for ease of description, the discussion will focus on periods of low human activity, but it should be appreciated that such examples may equally apply to periods of low external irradiation, or low human activity and low external irradiation.

Additionally, or alternatively, Eqs. (1) and (2) may be integrated over a relatively long period of time τ, so that the initial and final room's temperatures are approximately the same. The following expression is obtained under these assumptions:

$$0 = \overline{Q \Sigma t_{on}} + (\overline{q_{int}} + \overline{q_{ext}}) \tau - A_w/R_w (\overline{T_r - T_a}) \tau + \overline{q_{inf}} \tau \qquad (19)$$

where the bar designates averaging over time and Q is the HVAC heat supply (the term $\eta q^*$ of Eq. (1)) at state "on" (the "off" state is such that no heat supply is provided). The term $t_{on}$ represents the total duration of the period(s) when the HVAC is in the on state for the interval considered.

In some embodiments, air leakage rate may be determined by isolating changes in the status of an HVAC system that can be largely attributed to air leakage. This can be performed, in some embodiments, by isolating subsets of the HVAC runtime information that are associated with time intervals selected such that, with the exception of changes in wind speed, some (or many, or all) internal and external conditions stay substantially the same across the different intervals. More particularly, to isolate the impact of air leakage, time intervals may be selected that have substantially the same conditions (e.g., time intervals within a threshold value of each other, or environmental parameters like solar irradiation data or human activity within a threshold value of each other), but different wind speeds.

For example, two time intervals may be selected in which the difference between external and internal temperature, solar irradiation and internal human activity are substantially unchanged, but the time intervals are characterized by different wind speeds. A first data subset may be obtained by isolating the HVAC runtime data associated with the first time interval and a second data subset may be obtained by isolating the HVAC runtime data associated with the second time interval.

In one example, two different time windows are selected that have equal durations ($\tau 1$ and $\tau 2$), equal average temperatures (Tr and Ta), equal heat gains, but different wind speeds W1 and W2. Equal heat gains may be obtained by selecting the intervals such that times of the day are within a threshold value of each other, and/or such that environmental parameters like solar irradiation data and/or human activity are within a threshold value of each other. To simplify the mathematical formulation, a specific case is considered in which $W2 \approx 0$ and W1 is greater than 0. More generally, a down-selection to low activity/irradiation data that corresponds to low wind speeds (e.g., w<3 m/s) may be performed. It should be appreciated that this specific example is provided solely for purposes of illustration, as any other suitable value of W1 and W2 may be considered, as discussed in more detail further below.

Under these assumptions, the following expression is obtained:

$$\frac{\sum t_{on1} - \sum t_{on2}}{\tau} = \frac{(C_1 W_{wind}^{2.6} + C_T |T_a - T_r|^{1.3})^{0.5} (T_r - T_a)}{Q} - \frac{(C_{wind} W_2^{2.6} + C_T |T_a - T_r|^{1.3})^{0.5} (T_r - T_a)}{Q} \qquad (20)$$

where $t_{on1}$ represents the portion of the first time interval when the HVAC is in the on state, and $t_{on2}$ represents the portion of the second time interval when the HVAC is in the on state. In some embodiments, it may be further assumed that the wind effect and the stack effect have approximately the same magnitudes. In this case, it follows that:

$$c_1 w_{wind}^{2.6} \gg c_2 |T_a - T_r|^{1.3} \qquad (21)$$

Thus, Eq. (20) becomes:

$$\frac{\sum t_{on1} - \sum t_{on2}}{\tau} \approx \frac{(C_{wind} W_1^{2.6})^{0.5} (T_r - T_a)}{Q} \left(1 - \left(\frac{W_2}{W_1}\right)^{2.6}\right) \qquad (22)$$

The wind parameter $C_{wind}$ can be estimated subsequently using the portion of data corresponding to relatively high wind speed and low difference of room and ambient temperatures. $C_{wind}$ can be obtained from Eq. (22):

$$C_{wind} \approx \left[\frac{(\sum t_{on1} - \sum t_{on2}) Q}{\tau (T_r - T_a)}\right]^2 \frac{1}{W_1^{2.6} \left(1 - \left(\frac{W_2}{W_1}\right)^{2.6}\right)^2} \qquad (23)$$

The parameter $C_T$ may be obtained using the following expression:

$$c_{wind} (\overline{W^{2.6}}) = \beta C_T [\overline{(T_r - T_a)^{1.3}}] \qquad (24)$$

where $\beta$ represents the ratio between the wind effect and the stack effect. In one example, the wind effect and the stack effect may be assumed to have substantially the same magnitude. In this example, $\beta$ is approximately equal to 1.

In some embodiments, the air leakage rate of the building may be obtained based on $C_{wind}$ and/or $C_T$. In some embodiments, the "natural air leakage flow rate" $V_{natural}$ may be obtained as an example of air leakage rate, though other formulations may be used in other embodiments. $V_{natural}$ may be obtained from the following:

$$V_{natural} = \frac{C_{wind}(\overline{W^{2.6}}) + C_T[\overline{(T_r - T_a)^{1.3}}]}{\rho_{air} c_{pair}} \qquad (25)$$

where $\rho_{air}$ is the air density, and $c_{p,air}$ is the air heat capacitance. In yet another example, ACH50 (air changes per hour at 50 pascals pressure differential) may be obtained to represent the air leakage rate of the building. ACH50 may be computed as follows:

$$ACH_{50} = F \frac{V_{natural}}{V} 3600, \qquad (26)$$

where V is the building volume and 3600 is the number of seconds in an hour and F is a conversion factor. A conversion factor F between 10 and 25 may be used in some embodiments, though other ranges are also possible. Based on the air leakage rate (e.g., $V_{natural}$ or ACH50, among other examples) obtained as described herein, in some embodiments, it may be determined whether it would be suitable to retrofit the building to improve the energy efficiency of the building. This determination may be performed, for example, by comparing the obtained air leakage rate to a threshold, and by concluding that the retrofit opportunity is suitable if the air leakage parameter is greater than the threshold. An example of a retrofit is sealing of air leaks.

Figure 11:
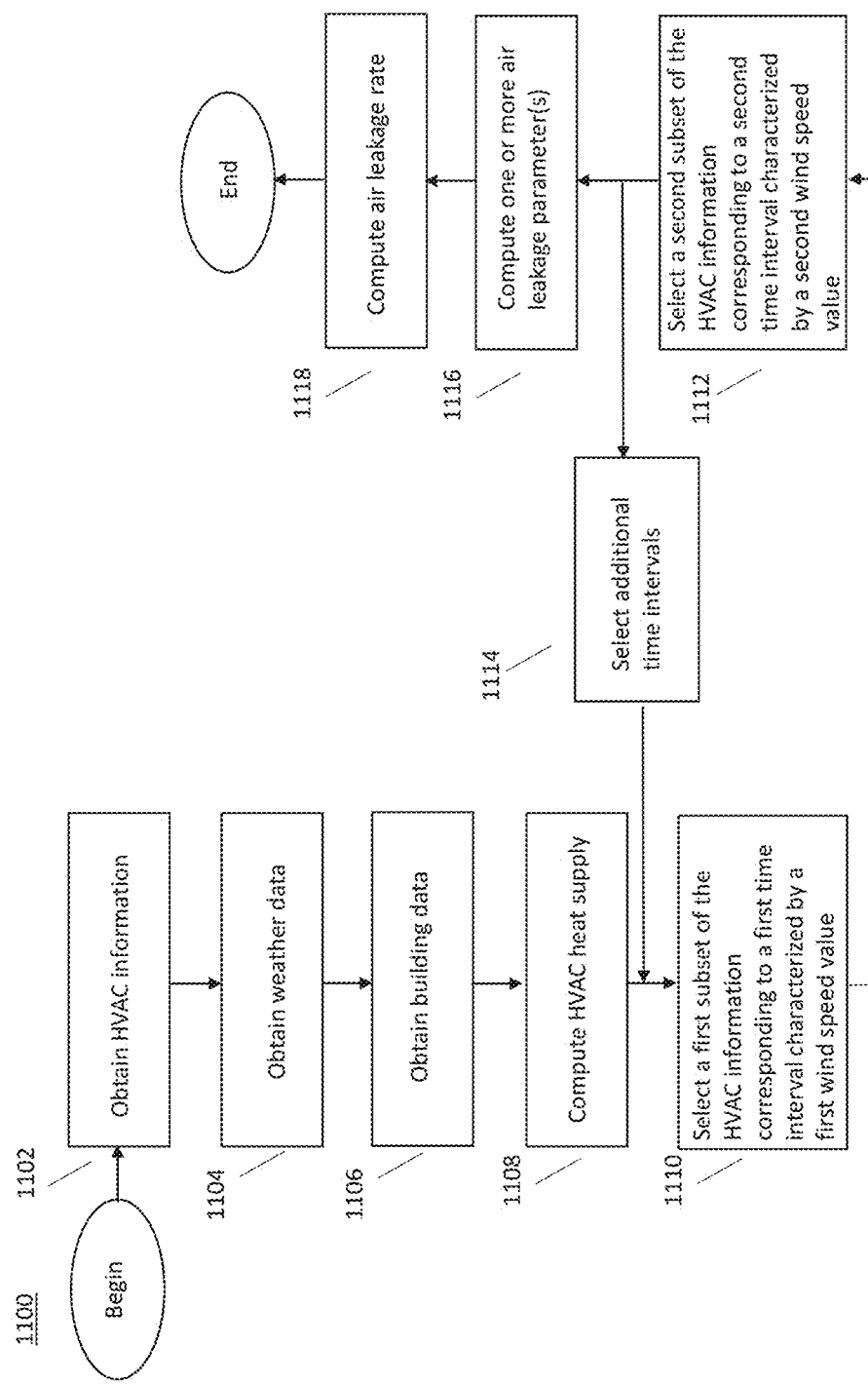
FIG. 11 is a flowchart illustrating a process for determining a parameter indicative of the air leakage characteristics of a building, in accordance with some embodiments.

FIG. 11 is a flowchart illustrating a process for determining a parameter indicative of the air leakage characteristics of a building, in accordance with some embodiments. The parameter may be used to determine the suitability of a retrofit opportunity to reduce the air leakage of a building. Process 1100 may be implemented by a computing device (e.g., a server) disposed outside the building (including in some embodiments disposed geographically remote from the building or disposed outside of a neighborhood or a municipality of the building). The computing device, in some embodiments, may be part of an air leakage estimation facility.

Process 1100 begins at act 1102, in which a computing device receives HVAC information. The HVAC information may include, for example, HVAC runtime data. The HVAC information may be obtained from a communicating thermostat disposed at the building, or may be derived from other data collected by the communicating thermostat, such as indoor temperature and/or temperature set point. Additionally, or alternatively, HVAC information may be obtained based on data obtained from a resource consumption meter, such as a gas meter and/or an electric meter. The HVAC information may be derived from resource consumption data, including using the techniques described herein. The computing device may obtain HVAC information using techniques described above, or using other techniques, as not all embodiments are limited in this respect. In some embodiments, for example, the computing device may receive HVAC information via one or more communication networks, including the Internet. In some embodiments, the HVAC information may relate to a particular range of time, which in the context of FIG. 11 may be referred to as the "analysis period."

At act 1104, the computing device obtains weather data. Among other quantities, the weather data may include outdoor temperature at a certain area or interest (e.g., the area where the building of interest is located), and wind speed and/or direction at the area. The weather data may relate to, in some embodiments, the analysis period that is the period of time for which the HVAC information was received.

The computing device may obtain weather data from network-accessible weather services, such as weather services that maintain databases or other data stores of weather information. Some such network-accessible weather services may be publicly-accessible services available via the Internet, though it should be appreciated that embodiments are not limited to operating with weather data retrieved from any particular weather service.

In embodiments in which weather data is received from a weather service, the computing device may receive the weather data in response to a query for the weather data. For example, the computing device may assemble a query that specifies a particular location and a particular time period for which weather information is sought. The location may be specified, for example, as a particular location of the building, such as a street address, a latitude/longitude, and/or a ZIP+4 building code, or other building identifier. Additionally or alternatively, the location may be specified as a region in which the building is located, such as a municipality, county, region, or other area. The query may identify time such that the query is a request for weather data for a range of time (e.g., for the entirety of the analysis period, or for a portion of the analysis period), or for a particular point in time (e.g., a particular hour and/or a particular day), or for another manner of retrieving weather information. In some embodiments, multiple queries may be performed for a particular location, for different parts of the analysis period, to obtain the weather data.

In other embodiments, rather than receiving the weather data from a weather service, the computing device may retrieve weather data from weather sensors (including temperature sensors, humidity sensors and/or wind sensors). Such a retrieval of weather data may be implemented in embodiments in which the computing device is retrieving/receiving HVAC information and weather information in real time, during the analysis period, and is thus receiving HVAC information for times during the analysis period and receiving weather data for times during the analysis period.

While examples of sources of weather data have been given, it should be appreciated that weather data may alternatively be received from any other source, as embodiments are not limited in this respect.

At act 1106, the computing device may obtain information relating to the building. The computing device may obtain building information from network-accessible services, such as services that maintain databases or other data stores of building information. Some such network-accessible services may be publicly-accessible services available via the Internet, though it should be appreciated that embodiments are not limited to operating with building information retrieved from any particular service.

In embodiments in which building information is received from a service, the computing device may receive the building information in response to a query for the building information. For example, the computing device may assemble a query that specifies a particular location for which building information is sought. In one specific example, the computing device may obtain building information from a registry of deeds or other public records including real estate registration and land information. The location may be specified, for example, as a street address, municipality, county, region, latitude/longitude, or other building identifier. Additionally or alternatively, the query may identify a building by the owner, tenant, or other person(s) having an interest in the building.

Building information obtained at act 1106 may include building overall area, building overall volume, area of some or all the rooms of a building, volume of some or all the rooms of a building, size of one or more units that are part of a building, number of windows, size of the windows, size of the walls (e.g., area and/or thickness), size of the ceilings (e.g., thickness), area of the roof, type of roof, number of levels, height of each level, material(s) used in the envelope (e.g., brick, wood, concrete, etc.). Some building information may be retrieved from a service. Other building information may be derived from data obtained from a service. For example, in some embodiments, information relating to the volume of a building, a unit or a room may be derived based on retrieved area information, and by assuming a certain height for the building/unit/room. Assumptions regarding the height of a building/unit/room may be made for example based on the building type and/or location. In some embodiments, one or more thermal characteristics of a building including but not limited to U-values, thermal capacitance, and thermal conductance, may be derived based on information retrieved at act 1106.

At act 1108, the computing device may obtain HVAC heat supply for the HVAC at the building. In some embodiments, the HVAC heat supply is obtained by computing req* (for example using Eq. (13)).

In some embodiments, the computing device may isolate subsets of the HVAC runtime information that are associated with time intervals selected such that, except for changes in wind speed, the internal and external conditions stay substantially the same across the different intervals.

In some embodiments, the identification of time intervals may be based on an evaluation of candidate matching time intervals to determine one or more sets (e.g., one or more pairs) of time intervals in which one, two, or more parameters that describe environmental conditions during the time intervals match. Matching time intervals may be determined by evaluating parameters in the intervals to identify intervals in which one or more of the parameters are identical and/or are substantially equal (e.g., are within a threshold value of one another). Examples of parameters that may be considered to match time intervals include, but are not limited to, time of day, solar irradiation and internal human activity.

For example, at act 1110, the computing device may select a first subset of the HVAC information corresponding to a first time interval, and at act 1112, the computing device may select a second subset of the HVAC information corresponding to a second time interval. Of course, not all embodiments are limited to using one pair of time intervals as multiple pairs of the first and second time intervals may be considered at acts 1110 and 1112. The first and second time intervals may be selected to isolate the impact of air leakage on HVAC runtime. Accordingly, the first and second time intervals may characterized by first and second wind speed values, and by substantially the same conditions.

Pairs of intervals may be matched, for example, if they are defined within identical times of day (e.g., both intervals are defined between 1 am and 5 am). Alternatively, two intervals may be matched if they are defined within clock intervals that are within a threshold value of each other. A first clock interval is considered to be within a threshold value of a second clock interval if the beginning (and/or end) of the first interval is within a threshold value of the beginning (and/or end) of the second interval. For example, considering a fifteen minute-threshold value and a first clock interval defined between 1am and 5 am, a second clock interval is within the threshold value of the first clock interval if it is defined between 12.45 am and 5.15 am, between 1.15 am and 5.15 am, between and 12.45 am and 4.45 am or between 1.15 am and 4.45 am. Thresholds may be defined in terms of absolute values (e.g., within fifteen minutes or within one hour) or in terms of percentages (e.g., within 10% or 20% of the overall duration of a time interval).

Additionally, or alternatively, two intervals may be matched if they share substantially the same solar irradiation (e.g., such that the solar irradiations are within a threshold value of each other). Solar irradiation data may be obtained for example using sensor(s) disposed in proximity to a building or using public databases including solar irradiation data at the location of interest. Different types of solar irradiation data may be used to indicate the degree of solar irradiation. One example of a quantity that may be used as a measure of solar irradiation is solar irradiance. Furthermore, quantities derived from solar irradiance (or from any other quantity indicative of solar irradiation) may also be considered, including average values, mean values, root mean square values, or peak values, among other values.

For example, a first time interval may be selected that has an average solar irradiance that is within a threshold value (e.g., 10%, 20% or 30%, among other possible values) of the average solar irradiance at a second time interval. In some embodiments, solar irradiation data may be expressed in terms of cloudiness. Accordingly, time intervals may be matched if they share the same degree of cloudiness. For example, two intervals may be matched if clear sky was present during these periods. Okta or other quantities may be used as a measure of the degree of cloudiness for purposes of matching time intervals based on solar irradiation. The degree of cloudiness may also be considered in a more qualitative fashion, and may segmented as follows: "clear," "mostly sunny," "partly sunny," "mostly cloudy," and "cloudy," though other ways of segmenting the degree of cloudiness are also possible. Thresholds may be defined in terms of absolute values. For example, two intervals may be matched if one interval has an average solar irradiance that is within 0.1 KW/m$^2$ of the average solar irradiance of another interval. Additionally, or alternatively, thresholds may be defined in terms of percentages. For example, two intervals may be matched if one interval has an average solar irradiance that is at least 90% of the average solar irradiance of another interval.

Additionally, or alternatively, two intervals may be matched if they share substantially the same internal human activity (e.g., such that human activity data indicative of the human activity inside a building during one interval is within a threshold value of the human activity data at another interval). Internal human activity may increase the indoor temperature of a building, and may therefore introduce an additional variable to the model. Different quantities may be used to represent human activity including for example data obtained from motion sensors installed inside the building.

Additionally, or alternatively, two intervals may be matched if they share the same wind directions. Matching intervals by wind direction may useful because it may allow to estimate the air leakage of each side of the building independently. Understanding which side of the building is subject to air leakage may aid in performing focused retrofits. Wind direction may be classified for example as follows: northerly, northwesterly, westerly, southwesterly, southerly, southeasterly, easterly, northeasterly. Of course, other ways of classifying the wind direction are also possible. Hence, two intervals may be matched if the wind associated with these two intervals, is oriented in a certain common direction.

Matching of time intervals that have different wind speeds may be performed in any suitable way. In some embodiments, time intervals may be matched if the respective quantities representing wind speed (e.g., average value, peak value or other values derived from wind speed data) are separated from each other by at least a threshold value. Threshold values may be defined in terms of absolute values. For example, intervals may be matched if the respective average wind speeds are separated by at least 10 m/s. Alternatively, or additionally, threshold values may be defined in terms of percentage. For example, two intervals may be matched if the average wind speed of one of these intervals is at least 50% greater than the average wind speed of the other interval. In other embodiments, time intervals may be matched if the respective quantities representing wind speed satisfy certain statistical requirements. Consider, for example, the statistical distribution of peak wind speed (or other quantities derived from wind speed data) over a predefined period of time (e.g., 2 months, 3 months, 6 months, etc.). Two intervals may be matched if the first interval has a wind speed (e.g., an average or peak wind speed) that is at least 90% (or other threshold values) of the maximum wind speed measured during a past period and the second has a wind speed (e.g., an average or peak wind speed) that is less than 10% (or other threshold values) of the maximum wind speed. In one example, a first interval is selected in which the wind speed is within a threshold value of the maximum wind speed over a past period and a second interval is selected in which the wind speed is within a threshold value if the minimum wind speed over the past period (or another period). Considering values close to the maximum and the minimum observed in a period may magnify the impact of air leakage on HVAC runtime data, thus enhancing the ability to determine air leakage parameters. The threshold values may be determined, in some embodiments, based on statistical analysis of recent weather data.

To further improve the accuracy of the air leakage parameter estimates, in some embodiments, the parameters obtained for multiple time intervals obtained over several days (e.g., more than fifty or more than one hundred days) may be combined. Accordingly, in some embodiments, process 1110 moves to act 1114, where additional first and second time intervals are selected. All (or some of) the first and second intervals may share substantially the same characteristics (e.g., having substantially the same solar irradiation, wind direction, and/or human activity). The average value of an air leakage parameter may be determined over the multiple time intervals. It should be appreciated that the data obtained over different time intervals may be combined in any suitable ways, averaging being only one example. When data sets are combined over multiple time intervals, noise due to variations in the conditions surrounding the measurements may be filtered out.

At act 1116, the computing device may obtain one or more air leakage parameters based on the first and second time intervals, and using the weather data obtained at act 1104 and/or the building data obtained at act 1106. It should be appreciated that, in some embodiments, air leakage parameters of the types described herein may be based on more than just one pair of time intervals, but may be based on multiple pairs of first and second time intervals. The air leakage parameter(s) may be quantities representing the air leakage of the building. The air leakage parameters may be obtained in any suitable way, including using the formulation discussed in connection to Eqs. (23-24). Thus, examples of parameters that may be computed at act 1116 include $C_{wind}$ and $C_T$.

At act 1118, the computing device may compute one or more quantities representing air leakage rate based on the one or more parameters computed at act 1116. For example, the computing device may compute a $V_{natural}$ and/or an ACH50 (e.g., according to Eqs. (25-26)). $V_{natural}$, the "natural air leakage flow rate," and ACH50, air changes per hour at 50 pascals pressure differential, are examples of parameters representing air leakage rates. In some embodiments, suitability of the building for a retrofit opportunity (e.g., sealing of air leakage) to improve energy efficiency of the building may be determined based on the air leakage rate. For example, it may be determined that sealing of air leakage is appropriate if the air leakage rate is greater than a certain threshold value.

Figure 12:
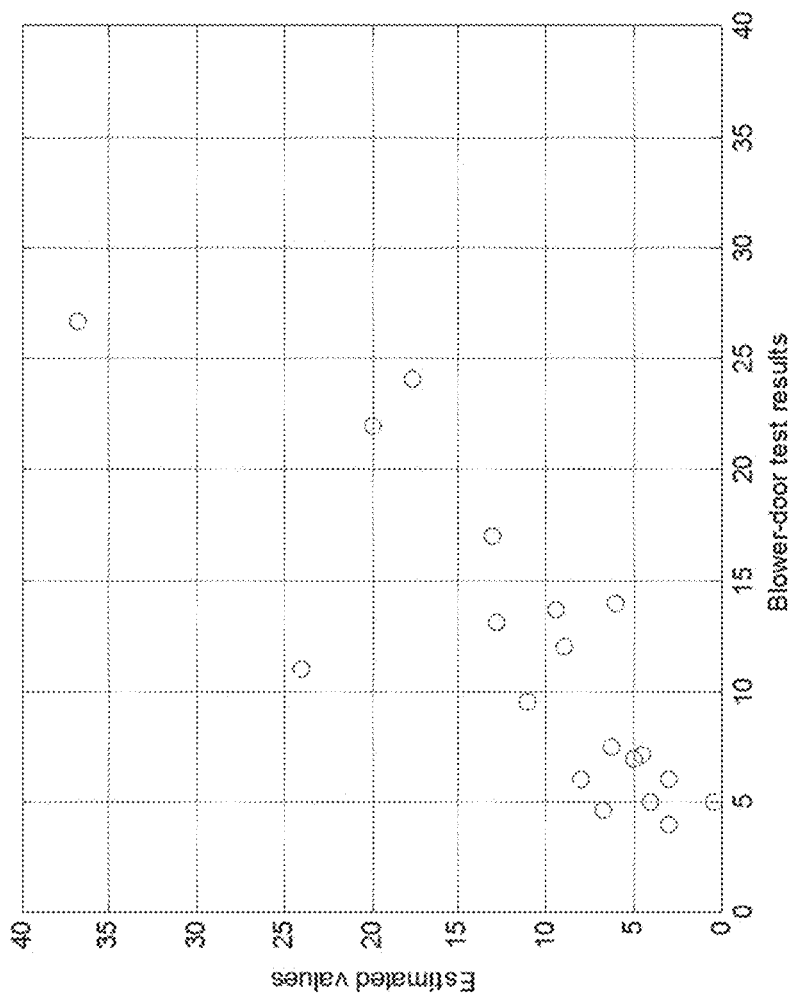
FIG. 12 is a plot illustrating a comparison between ACH50 parameters measured using the blower door test and ACH50 parameters determined using the illustrative process of FIG. 11, in accordance with some embodiments.

To confirm the accuracy of the techniques described herein, values of ACH50 computed using the techniques described herein at nineteen different houses were compared with ACH obtained using the blower-door test at the same buildings. The results of this comparison are illustrated at FIG. 12, which plots ACH50 values estimated using Eq. (26) (y-axis) versus ACH50 values obtained using the blower-door test (x-axis). Each sample of the plot corresponds to one of the nineteen buildings considered. The plot shows generally good agreement between the values obtained using the blower-door test and the values determined using Eq. (26), thus confirming the accuracy of the techniques described herein.

Example of Estimation of Times On and Off from Interval Meter Data

Estimation may be performed using information on resource consumption, which may be provided by electric/gas meters. For example, on and off cycles for HVAC equipment such as air conditioners and gas furnaces may be determined from an analysis of interval electric data indicating consumption of electricity over time, and/or for gas furnaces and/or gas boilers from an analysis of interval gas data indicating consumption of gas over time. Although conventional nonintrusive appliance load monitoring (NIALM) techniques can be used to disaggregate AC or furnace fan loads from interval electric data, the disaggregation accuracy of HVAC equipment loads and HVAC on/off cycles using these conventional techniques may be low due to the low data sampling rate (e.g., 15 minutes) and the operation of other larger appliances.

In some embodiments, to overcome these challenges, selected time windows are considered, such as periods of low activity/irradiation in the building (e.g., nighttime and other periods of low internal heat gains/losses), and apply an optimization procedure suitable for 1-hour gas interval data. Briefly, large fluctuations of 1 hour-resolution gas consumption during periods of low activity may be caused by imposition of the hourly time window (recording time) on the cycling pattern of HVAC gas consumption (i.e., approximately constant gas consumption rate during time on and zero gas consumption during time off). By varying the potential durations of time on, time off and the time lag between the start of first cycle and the start of the recording hour, and imposing some heuristic constraints to prevent meaningless results, it is possible to create estimated gas consumption profiles and select the one that best fits the actual gas consumption profile recorded over a particular period of low activity. Since there are only a few data points for gas consumption during a period of low activity, constant durations of times on/off during a such a period are assumed, so that only three variables may be needed to be determined. In this case, only have a single pair of data points per period of low activity may be provided.

A similar optimization-based approach can be applied to electric interval data.

Example of an Algorithm for Remote Audits of a Given Home

Figure 4:
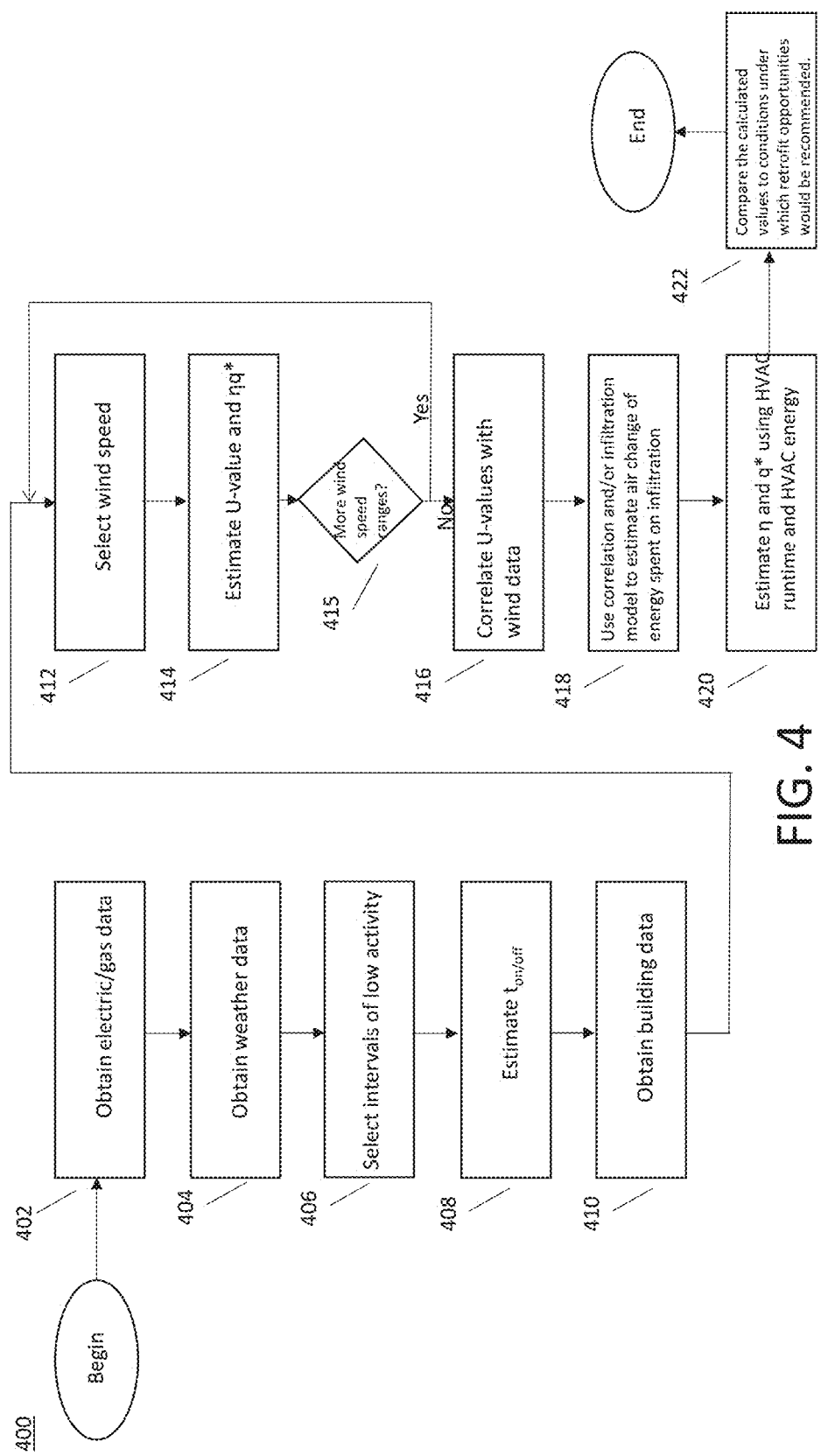
FIG. 4 is a flowchart illustrating an algorithm for determining suitability of a retrofit opportunity for a building using meter data, in accordance with some embodiments.

An example of an algorithm for remote audits is depicted in FIG. 4. Algorithm 400 may begin at act 402, in which interval electric and/or gas data for a building are obtained, e.g., during a heating season. At act 404, weather data (e.g., ambient temperature and wind) may be obtained for example from public database(s). At act 406, a data subset corresponding to an interval of low activity (and/or external irradiation) is selected. The expression "low activity data" will be used to indicate such down-selected data. The internal and external heat gains in grey-box equations/solutions may be neglected for low activity data. At act 408, HVAC on/off durations for each period of low activity may be estimated, for example using NIALM or the above-described optimization-based approach.

At act 410, building dimensions from public database(s) may be obtained if available. If no dimensions are available, a typical volume to area ratio for a residential building may be assumed.

At act 412, a wind speed range may be selected from the low activity data. In one embodiment, a range of low wind speed (e.g., <3 m/s) is selected at act 412.

At act 414, the U-value(s) of lumped wall(s) and the parameter expressing the effective power consumption of HVAC (e.g., hq* in Eq. 15) are estimated based on Eqs. (1)-(14), or Eqs. (17)-(18).

Acts 412 and 414 may be repeated for several wind speed ranges (e.g., 5-10 m/s, 10-15 m/s, >15 m/s), if it is determined, at act 415, that additional wind ranges are appropriate. Speed ranges may be provided as an input step during a configuration for the building or for the system as a whole by an administrator.

At act 416, a sample of estimated U-values obtained for different ranges of wind speed may be used to correlate these estimates with the data on wind speed/direction for the same periods of low activity. Using models for infiltration dependence on wind and the obtained correlation, the air changes per hour for the building or fraction of energy spent on infiltration may be estimated (act 418).

At act 420, HVAC energy consumption rate (e.g., q* in Eq. 1) using HVAC runtime from CT nighttime data and HVAC energy estimated by PRISM from monthly energy bills may be estimated. HVAC efficiency may be obtained as a ratio of the effective power consumption to this estimate.

At act 422, the computed values can be compared to conditions under which retrofit opportunities would be recommended. For example, the computed values may be computed to predefined thresholds.

Using this algorithm, a meaningfully large to Utility (e.g., more than 1,000) sample of homes can be ranked by the three retrofit opportunities, and top candidate homes can be approached with particular retrofit offers.

II. Example of Mathematical Framework using Thermostat Data

As in the case of data obtained from electric/gas meters, equations (1-2) may be used to model the thermal behavior of the building. In this case, however, the status of the HVAC (e.g., ton/off) may be inferred from data obtained from a thermostat.

The closed-form solution to Eq. (1-2) is given by (assuming $T_a$ being constant during time t)

$$T_r(t) = a + b\exp(-s_1 t) + c\exp(-s_2 t) \quad (27)$$
where $$A = \frac{1}{s_2 - s_1}\left\{T_r(0)(2\gamma - s_1) + \alpha T_w(0) + T_a\left[\beta - \frac{\gamma(\alpha + 2\beta)}{s_1}\right] + q_r\left[1 - \frac{2\gamma}{s_1}\right] - \frac{\alpha}{s_1}q_w\right\} \quad (28)$$

$$B = T_r(0) - \frac{1}{s_1 s_2}[T_a\gamma(\alpha + 2\beta) + 2\gamma q_r + \alpha q_w] - A$$

$$C = \frac{1}{s_1 s_2}[\gamma T_a(\alpha + 2\beta) + 2\gamma q_r + \alpha q_w]$$

$$T_w(t) = A^*\exp(-s_1 t) + B^*\exp(-s_2 t) + C^* \quad (29)$$

$$A^* = \frac{A}{\alpha}(\alpha + \beta - s_1) \quad (30)$$

$$B^* = \frac{B}{\alpha}(\alpha + \beta - s_2)$$

$$C^* = \frac{C(\alpha + \beta) - \beta T_a - q_r}{\alpha}$$

$$s_{1,2} = \frac{\alpha + \beta + 2\gamma \pm \sqrt{D}}{2}, \ D = \alpha^2 + \beta^2 + 4\gamma^2 + 2\alpha\beta - 4\beta\gamma$$

In Eqs. (27)-(30), $$\alpha = \frac{U_w A_w}{C_r} \quad (23)$$

$$\beta = \frac{L}{C_r}$$

$$\gamma = \frac{U_w A_w}{C_w}$$

-continued $$q_r = \frac{\eta q^* + q_{int}}{C_r}$$

$$q_w = \frac{q_{ext}}{C_w}$$

The parameters in Eqs. (27-30) comprise the retrofit parameters ($U_w$, L and η) to be estimated by curve-fitting along with other building-related parameters ($A_w$, $C_r$, $C_w$, q*, $q_{int}$ and $q_{ext}$). Some of the latter ones ($A_w$, $C_r$, $C_w$) can be calculated using basic data about a building (e.g., building dimensions) that can be obtained from public databases. The HVAC energy consumption rate (q*) can be calculated using HVAC energy disaggregated from household monthly energy consumptions by conventional methods, divided by the HVAC on-time (available from CT). The internal and external gains are unknown, but a way to circumvent this problem is proposed under items B and D above, according to some embodiments. Finally, since the parameter L is coupled to parameter $U_w$, the former can be separated by correlating wind speed with U-value.

It should be appreciated that more advanced models for the infiltration may comprise not only the wind-related infiltration but also the stack effect. Accordingly, the model provided in connection with Eq. (15) may be used.

It should be further appreciated that, for non-negligible infiltration rates, Eq. (1) becomes nonlinear and the system of Eqs. (1)-(2) can only be solved numerically. Likewise, additional lumped elements with nonzero heat capacity may increase the order of the grey box model and the underlying number of differential equations for the heat transfer. Generally, no closed-form solution can be obtained for such higher-order models. A solution to such equations may be obtained by solving the equations numerically and fitting the numerical solution to the measured data (e.g., indoors temperature, outdoors temperature and wind speed and HVAC runtime). In this way, the parameters of interest (e.g., the thermal characteristics of the building) can be estimated. Numerical solutions of the equations may be provided using proprietary or commercial software (e.g., Matlab's System Identification toolbox).

In some embodiments, the estimation techniques described herein, whether using closed-form or numerical solutions, may result in so-called overfitting when applied to limited restricted data (e.g., interval CT data collected over a single night). Such overfitting may manifest itself in significantly different parameter estimates obtained for different restricted data portions (e.g., for different nights), while all of or some such estimates may also differ significantly from the building true parameters.

To reduce overfitting, approximate correlations to limit the parameter search space in the numerical techniques may be used. In some embodiments, an approximation to the second-order grey box model is considered, but a similar method can be formulated for higher-order grey box models. For example, Eq. (16) provides a first-order formulation of Eqs. (1)-(2) and (15).

Eq. (16) may represent a valid approximation of these equations for relatively short periods of time on and low activity data. As described above, for the low activity data the last term of Eq. (16) can be neglected; moreover, for the relatively short periods of time on, the linearization of Eq. (17) can be applied. In the quasi steady-state for the low activity data, Eq. (18) can be applied.

For a given home and a given dataset of various times on (ton), internal and ambient temperatures and wind speeds obtained for numerous periods of low activity, the constants of interest along with their corresponding uncertainties (e.g., standard deviations) can be estimated by curve fitting using Eqs. (17) and (18). In this way, confidence intervals for the parameters can be built. These confidence intervals can serve as the boundaries that limit the search space for the more accurate parameter estimates to be obtained by the numerical procedure as considered above.

To make these equations more amenable to real world applications, a down-selection to low activity/irradiation data that correspond to low wind speeds (e.g., w<3 m/s) may be performed. In this case, the nonlinearity related to air infiltration can be easily checked visually by plotting the total time on during periods of low activity (or inverse time on) versus the ambient temperature: the higher the infiltration, the higher the parameter CT and the higher the weight of the parabolic deviation from linear relation in Eq. (17) or Eq. (18). The wind parameter $C_{wind}$ can be estimated subsequently using the portion of data corresponding to relatively high wind speed and low difference of room and ambient temperatures.

Figure 5:
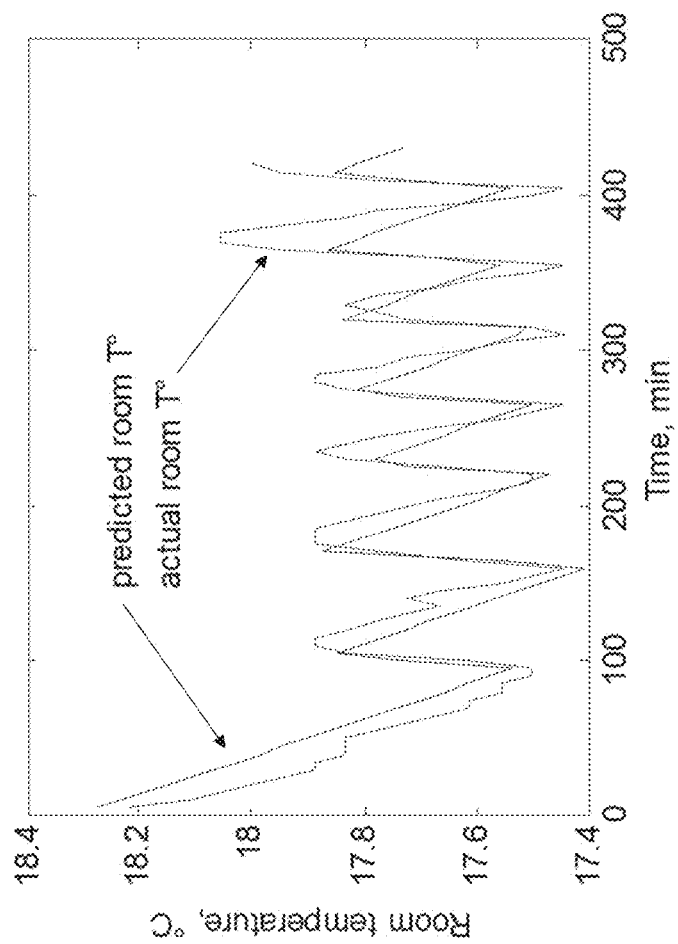
FIG. 5 is a plot illustrating examples of predicted and actual indoor temperature versus time, in accordance with some embodiments.

FIG. 5 shows an example in which the indoor temperature solution to Eq. (19) is fitted to experimental data obtained for a period from 12 am to 5 am at a home in heating season. In this example, room and ambient temperatures and wind speed are recorded every 5 min, and HVAC runtime is recorded every second by CT. Nighttime data for Mar. 3, 2016 are shown. The source energy rate hq* was approximated as a constant during "on" time and 0 during "off" time. The best-fit results are: $\hat{R}=17$ h·ft$^{2 \cdot \circ}$ F./Btu, $\hat{hq^*}=1.45$ kW, as compared to an onsite audit wall R-value=15 (13% difference).

Example of an Algorithm for Remote Audits of a Given Home

Figure 6:
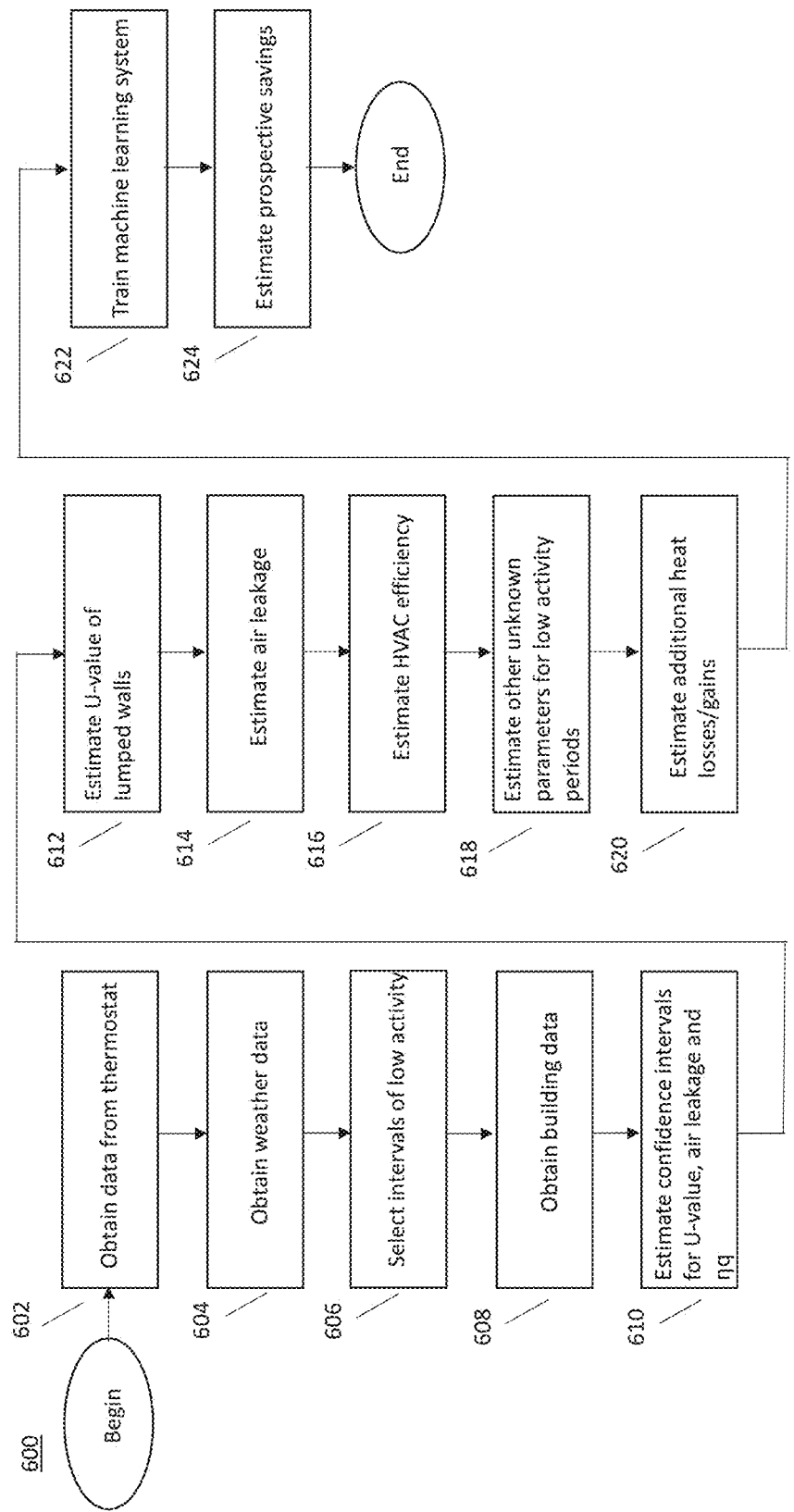
FIG. 6 is a flowchart illustrating an algorithm for determining suitability of a retrofit opportunity for a building using thermostat data, in accordance with some embodiments.

An example of an algorithm for remote audits is depicted in FIG. 6. Algorithm 600 may begin at act 602, in which thermostat data are obtained for a building over, e.g., a heating season. At act 604, weather data may be obtained. At act 606, a data subset corresponding to an interval of low activity (e.g., nighttime) is selected. The internal and external heat gains in grey-box equations/solutions may be neglected for ow activity data. At act 608, building dimensions, energy bills and/or additional data are obtained from public database(s) and/or utility company.

At act 610, confidence intervals for the U-value, air leakage parameters and ηq may be obtained using approximate correlations (e.g., using Eqs. 17-18) by standard curve fitting.

At act 612, the U-value(s) of lumped wall(s) may be estimated by fitting solution to grey-box model to selected communicating thermostat data and by constraining the optimization in curve fitting to the parameter space defined by the confidence intervals. The solution can be Eq. (19) if the simple second order grey-box model is considered. Alternatively, if a closed-from solution is not amenable for derivation, the U-value(s) can be estimated by a conventional finite differences method that simultaneously solves the differential equations and estimates their parameters (e.g., a commercially available Matlab System Identification toolbox). The particular rank and other details of the grey model may be determined upon the home HVAC type (e.g., furnace or boiler, this information is available from CT data). The U-values can be estimated by using the entire dataset of down-selected data (i.e., for several month of heating season) or by sub-samples from that dataset, e.g., using data for a single low activity period. The search space for U-values can be constrained by the confidence interval.

At act 614, parameter(s) characterizing air leakage (e.g., parameters in Eq. 15) are estimated. The parameters can be converted into standard units of air change per hour using the building data. If not separable, a sample of estimates of U-values obtained for different low activity periods can be used, and these estimates can be correlated with the data on wind speed/direction for the same periods. Using well-known models for infiltration dependence on wind and the obtained correlation, the air changes per hour for the home or fraction of energy spent on infiltration can be estimated. The considerations discussed in connection with act 612 apply.

At act 616, parameter(s) expressing the effective power consumption of HVAC (e.g., hq* in Eq. 1) are estimated. HVAC energy consumption rate (e.g., q* in Eq. 1) can be estimated using HVAC runtime data from thermostat low activity data and HVAC energy estimated by PRISM from monthly energy bills. HVAC efficiency h can be estimated as a ratio of these two estimates. The considerations discussed in connection with act 612 apply.

At act 618, other unknown parameters of grey-box model as appropriate for low activity data are obtained.

Using the values of parameters estimated by low activity data and the remaining thermostat data (i.e., not nighttime), the values of additional heat losses/gains (e.g., $q_{int}$ and $q_{ext}$ in Eqs. 1-2) are estimated separately for meaningful periods of time (e.g., weekday early afternoon in December, or weekday morning in February) (act 620).

At act 622, machine learning (ML) technique(s) may be trained using the obtained estimates and weather/time data to predict the additional heat losses/gains.

At act 624m prospective savings in a home can be estimated. To this end, the estimates of the retrofit parameters obtained earlier may be replaced with the values known to represent post-retrofit home, and the prospective HVAC runtime may be calculated while keeping the time series of indoor temperature and weather the same.

In this way, a meaningfully large to Utility (e.g., more than 1,000) sample of homes can be ranked by the three retrofit opportunities, and top candidate homes can be approached with particular retrofit offers.

III. Examples of a Case Study: Real Homes in Heating Season

In some embodiments, lumped physical parameters corresponding to the three major retrofit opportunities are estimated. Conventional on-site audits do not usually yield quantitative parametric values. Instead, the retrofit opportunities are typically characterized qualitatively or categorically in onsite audits. Accordingly, for a point of comparison to demonstrate feasibility of our method, it is desirable to have a sample of on-site audited homes that were determined to have various degrees of retrofit opportunities.

Fraunhofer CSE has an agreement with Holyoke Gas & Electric (HG&E) to analyze interval data from approximately 15,000 homes of HG&E's customers located in Holyoke, Mass. All of these homes are equipped with electric meters that provide 15-minute electricity interval data, while some (~5,000) are also equipped with advanced gas meters that provide 1-hour gas interval data. For this preliminary analysis, data from 84 coupled accounts were received for which some partial "ground truth" in terms of home insulation level and HVAC heating type was available.

Figure 7:
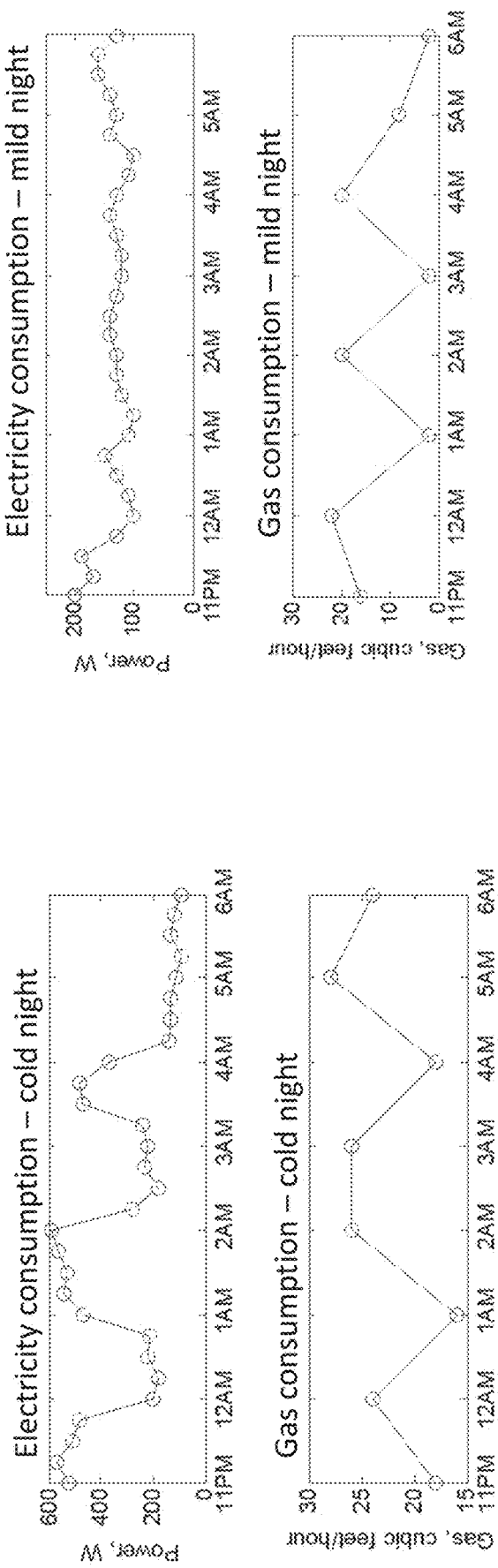
FIG. 7 are a plurality of plots illustrating examples of power and gas consumption versus time, in accordance with some embodiments.

FIG. 7 shows electricity and gas consumptions over a cold and a mild nights for home #1 from this data set. For the cold night, the electricity consumption indicates presence of a cycling electric appliance with about 300 W power draw. Although this appliance could potentially be a fan of the gas furnace, no such appliance is observable for the mild night. Therefore, the cycling electric appliance cannot be the gas furnace fan; it could be, e.g., an auxiliary heating device. The gas consumption at both nights indicates presence of a large cycling gas appliance that could only be a space heating device with no forced air, i.e., a boiler.

The patterns of electricity and gas consumption shown in FIG. 7 are typical for the HG&E data set. The ground truth data on this data set also suggests that out of the 84 homes, only four used electricity and three used oil for space heating, with all the remaining homes using gas boilers, not furnaces. The main challenge of application of the proposed method to the data set is determination of HVAC runtime. Indeed, determination of time on/off of a 50-70 W device (i.e., boiler water pump) from 15-minute resolution data is beyond the capability of the state-of-the-art disaggregation methods. The strongly non-constant gas consumption, however, indicates a possibility of using gas consumption data to determine characteristic runtime overnight.

HVAC Runtime Estimation

Large fluctuations of gas consumption during nighttime as seen in FIG. 7 are caused by imposition of the hourly time window (recording time) on the cycling pattern of HVAC gas consumption (i.e., approximately constant gas consumption rate during time on and zero gas consumption during time off). By varying the potential durations of time on, time off and the time lag between the start of first cycle and the start of the recording hour, and imposing some heuristic constraints to prevent meaningless results, it is possible to create estimated gas consumption profiles and select the one that best fits the actual gas consumption profile recorded over a particular night. Since there are only eight data points for overnight gas consumption, constant durations of times on/off during a night were assumed, so that only three variables will need to be determined. In this case, only have a single pair of data points is needed for the correlation, (Eq. (5)), per night.

Although this assumption is coarse, at the first approximation, it would result in increasing the dispersion in the inverse time on/off—outdoor temperature correlation, Eq. (5), and correspondingly increase the uncertainty in U-value estimation, Eq. (8), but should not lead to a bias in the estimated U-value.

A bias can be induced if a household implements thermostat setbacks during the nighttime. However, the gas consumption data plotted on FIG. 7 (or for randomly selected other homes in this data set) do not indicate a systematic reduction in gas consumption that would follow such a setback. On the other hand, a thermostat setback at night would either imply a different thermostat set point during most of the nighttime in case the actual indoor temperature, as sensed by the thermostat, quickly reached the new set point, or a larger thermostat deadband $\Delta T$ otherwise. Both possibilities can be mathematically modeled.

Inverse Runtime—Outdoor Temperature Correlations and U-Value Estimations

Using the method explained in the previous sections, durations of time on and off for each night over the heating season 2014-2015 were estimated, for each home in our data set. For the outside temperature, the Weather Underground hour-resolution historical data for Holyoke, Mass. were used, and a median temperature for each night to be matched with the inverse runtime, Eq. (5) was computed. Since the gas-heated homes consume much more gas during the heating season, the seven homes that use electric- or oil heating were clearly identifiable on the overall gas consumption plots (not shown in this paper), and the data from these homes were excluded from further consideration.

Figure 8B:
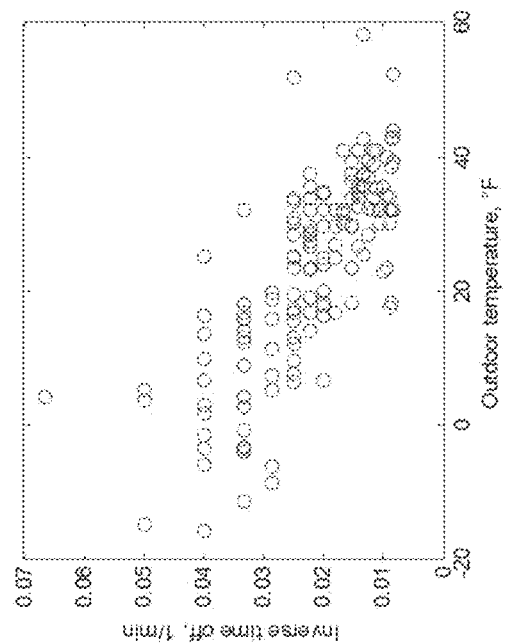
FIGS. 8A-8B are plots illustrating an inverse of a time in which an HVAC is running versus outdoor temperature, in accordance with some embodiments.
Figure 8A:
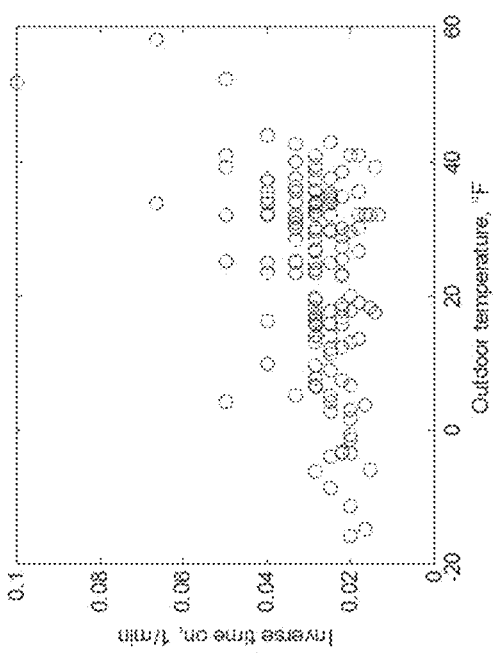

FIGS. 8A-8B shows the experimental correlations for a randomly selected home. The predicted correlations, (Eq. (5)) are clearly seen for relatively small times on and off. For larger times (approximately those exceeding 30 minutes), the correlation is much weaker, most likely because the two-term Taylor expansion becomes a too coarse an approximation.

To estimate the overall lumped U-value by Eq. (8), in this initial work, data pairs with the temperature exceeding 20° F. for the time on correlations were selected, the linear regression slope was estimated, and the ratio V/Aw=2.5 m and thermostat deadband T=1° F. for all the homes were assumed. Also, to convert the U-value calculated from the lumped differential equations, Eqs. (2)-(3) to the conventional U-value, a correction factor of 2 was used.

Figure 9B:
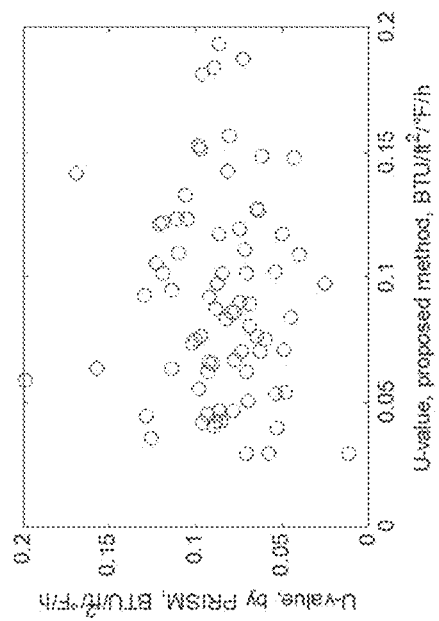
FIG. 9B is a plot illustrating U-values computed according to PRISM method versus U-values computed according to a proposed method, in accordance with some embodiments.
Figure 9A:
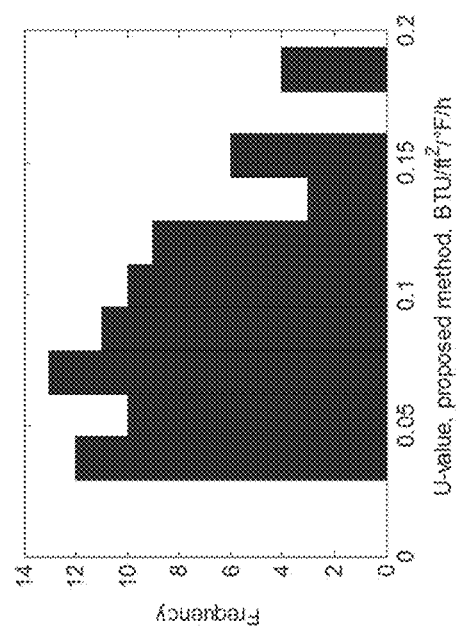
FIG. 9A is a histogram of U-values, in accordance with some embodiments.

FIG. 9A presents the U-value estimation results. Since the real value for the U-value may not be accessible, the "typical" grade of the home insulations obtained by HG&E into 0.08 [BTU/ft2·° F.·h] was translated as the recommended R-value for walls in US climate zone 5 is 13 [ft2·° F.·h/BTU]. As illustrated, the estimated U-values range from ~50% to ~200% of this "typical" value, which is believed to be still within the "typical" category.

To get a better sense of the feasibility of the proposed method, interval gas data were used. Accordingly, the measured gas consumption flow rate was converted into the rate of energy consumption using the combustion heat of the methane, and a conventional method to nighttime data to estimate the overall U-value was applied, assuming 100% HVAC efficiency and the total external area of a home being 400 m². Conventional estimates of U-values are plotted against the U-values estimated by the proposed method in FIG. 9B. As illustrated, the conventional range of U-values is similar to that of the proposed method, which partially validates the latter. On the other hand, there is no correlation between the U-values calculated by either method. This lack of correlation can be attributed to different sources of uncertainty underlying the two methods.

In the proposed method, sources of uncertainty include model-based factors (general coarseness of lumped second-order gray-box models, limitation of two-term Taylor expansion and assumed in this work steady-state initial wall temperature), time estimation factors (indirect estimation of time on/off from hourly resolution data, arbitrary usage of 20° F. as the boundary for correlations) and geometric factor (V/Aw). For the conventional approach as applied to nighttime hourly data, the sources of uncertainty are also model-based (essentially coarseness of first-order lumped model coupled with the steady state and constant indoor temperate assumptions), the HVAC efficiency that cannot be decoupled from U-value, and the geometric factor (Aw). Since these uncertainties are different and because the overall uncertainty apparently is larger than the actual variability of U-value among the homes, the estimated U-values are not correlated either.

IV. Discussion of Some Computer-Implemented Embodiments

Techniques operating according to the principles described herein may be implemented in any suitable manner. Included in the discussion above are a sequences of steps showing the steps and acts of various processes that enable remote auditing of buildings and determination of suitability of different retrofit opportunities to improve an energy efficiency of the building. The processing and decision blocks of the sequences above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the discussions of sequences of steps included herein do not depict the syntax or operation of any particular circuit or of any particular programming language or type of programming language. Rather, the discussions of sequences of steps illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application. Embodiments are not limited to being implemented in any specific number, division, or type of functional facilities. In some implementations, all functionality may be implemented in a single functional facility.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 1006 of FIG. 10 described below (i.e., as a portion of a computing device 1000) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Figure 10:
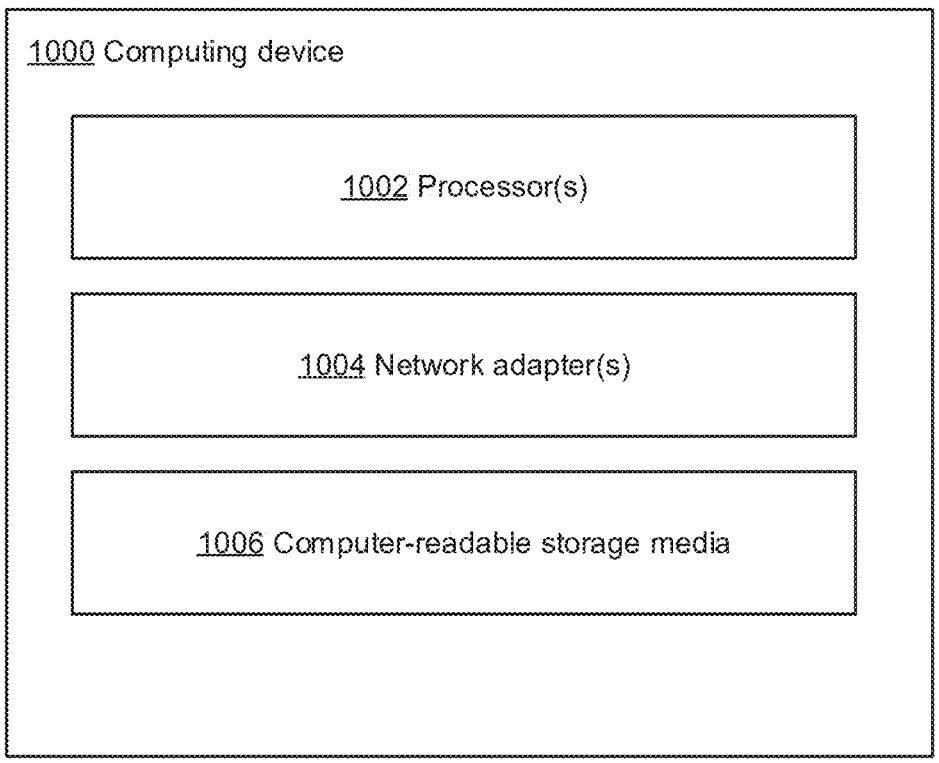
FIG. 10 illustrates one exemplary implementation of a computing device, in accordance with some embodiments.

In some, but not all, implementations in which the techniques may be embodied as computer-executable instructions, these instructions may be executed on one or more suitable computing device(s) operating in any suitable computer system, including the exemplary computer system of FIG. 10, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing devices (co-located or geographically distributed) dedicated to executing the techniques described herein, one or more Field-Programmable Gate Arrays (FPGAs) for carrying out the techniques described herein, or any other suitable system.

FIG. 10 illustrates one exemplary implementation of a computing device in the form of a computing device 1000 that may be used in a system implementing techniques described herein, although others are possible. It should be appreciated that FIG. 10 is intended neither to be a depiction of necessary components for a computing device to operate as a remote computing device in accordance with the principles described herein, nor a comprehensive depiction.

Computing device 1000 may comprise at least one processor 1002, a network adapter 1004, and computer-readable storage media 1006. Computing device 1000 may be, for example, a desktop or laptop personal computer, a personal digital assistant (PDA), a smart mobile phone, a server, a wireless access point or other networking element, or any other suitable computing device. Network adapter 1004 may be any suitable hardware and/or software to enable the computing device 1000 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 1006 may be adapted to store data to be processed and/or instructions to be executed by processor 1002. Processor 1002 enables processing of data and execution of instructions. The data and instructions may be stored on the computer-readable storage media 1006.

The data and instructions stored on computer-readable storage media 1006 may comprise computer-executable instructions implementing techniques which operate according to the principles described herein. In the example of FIG. 10, computer-readable storage media 1006 stores computer-executable instructions implementing various facilities and storing various information as described above. Computer-readable storage media 1006 may store the inputs, the outputs and the lumped thermal characteristics described above, among other variables.

While not illustrated in FIG. 10, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method comprising:
   obtaining, using at least one computing device disposed remote from an electronic meter of a building, heating, ventilation and air conditioning (HVAC) information indicative of HVAC runtime at the building;
   selecting, using the at least one computing device, a first subset of the HVAC information corresponding to a set of first time intervals characterized at least in part by a first wind speed value;
   selecting, using the at least one computing device, a second subset of the HVAC information by matching each time interval within the first set of time intervals with a corresponding second time interval characterized at least in part by a second wind speed value less than the first wind speed value, wherein each second time interval has a start or end timestamp that satisfies a threshold in relation to a start or end timestamp of each first time interval, wherein the first and second wind speed values represent information relating to wind speed during the first and second time intervals, respectively, each second time interval having at least one outdoor weather parameter and at least one indoor weather parameter that satisfies a similarity threshold when compared with corresponding outdoor and indoor weather parameters of a corresponding first time interval;
   computing, using the at least one computing device and based on the first and second subsets of the HVAC information and a stack effect parameter, an air leakage parameter indicative of an air leakage of the building, wherein the stack effect parameter is calculated based on a relationship to a wind effect parameter;
   computing, using the at least one computing device, at least one confidence interval for one or more thermal characteristics of the building comprising at least one of a value indicative of a thermal insulation or a value indicative of a heating, ventilation and air conditioning (HVAC) efficiency;
   executing, using the at least one computing device, a computer model to calculate an estimated one or more thermal characteristics of the building, wherein the computer model identifies possible values of the estimated one or more thermal characteristics of the building in accordance with the at least one confidence interval;

simulating, using the at least one computing device, a set of retrofit opportunity scenarios to determine suitability of the building for a retrofit opportunity to improve energy efficiency of the building, wherein for each retrofit opportunity scenario the at least one computing device calculates one or more simulated air leakage parameters and the one or more simulated thermal characteristics for the building and compares the simulated air leakage parameters with the computed air leakage of the building; and generating and transmitting, using the at least one computing device, an electronic notification to an electronic device associated with the building, the notification comprising at least one recommendation corresponding to at least one simulated retrofit opportunity to improve energy efficiency of the building by modifying at least the air leakage of the building.

2. The method of claim 1, wherein obtaining the HVAC information comprises:

receiving, from a communicating thermostat disposed at the building and using the at least one computing device, temperature data indicative of a temperature at the building; and computing, using the at least one computing device, the HVAC information based on the temperature data.

3. The method of claim 1, wherein obtaining the HVAC information comprises:

receiving, from a resource consumption meter disposed at the building and using the at least one computing device, resource consumption data; and computing, using the at least one computing device, the HVAC information based on the resource consumption data.

4. The method of claim 1, wherein selecting a first subset of the HVAC information corresponding to a first time interval characterized at least in part by a first wind speed value and selecting a second subset of the HVAC information corresponding to a second time interval characterized at least in part by a second wind speed value comprises selecting the first and second subsets of the HVAC information corresponding to the first and second time intervals being characterized by first and second internal human activity data, respectively, indicative of human activity at the building, wherein the first internal human activity data is within a threshold value of the second internal human activity data.

5. The method of claim 1, wherein selecting a first subset of the HVAC information corresponding to a first time interval characterized at least in part by a first wind speed value and selecting a second subset of the HVAC information corresponding to a second time interval characterized at least in part by a second wind speed value comprises selecting the first and second subsets of the HVAC information corresponding to the first and second time intervals being characterized by first and second solar irradiation data, respectively, wherein the first solar irradiation data is within a threshold value of the second solar irradiation data.

6. The method of claim 1, wherein selecting a first subset of the HVAC information corresponding to a first time interval characterized at least in part by a first wind speed value and selecting a second subset of the HVAC information corresponding to a second time interval characterized at least in part by a second wind speed value comprises selecting the first and second subsets of the HVAC information corresponding, respectively, to the first time interval being defined at a first clock interval and the second time interval being defined at a second clock interval, the first clock interval being within a threshold range of the second clock interval.

7. The method of claim 1, wherein selecting a first subset of the HVAC information corresponding to a first time interval characterized at least in part by a first wind speed value comprises selecting a first subset of the HVAC information in which the first wind speed value is at least 50% of a maximum wind speed value measured throughout a past period of time.

8. The method of claim 1, wherein selecting a first subset of the HVAC information corresponding to a first time interval characterized at least in part by a first wind speed value comprises selecting a first subset of the HVAC information in which an average wind speed exceeds a first wind speed threshold.

9. The method of claim 8, wherein selecting a second subset of the HVAC information corresponding to a second time interval characterized at least in part by a second wind speed value comprises selecting a second subset of the HVAC information in which an average wind speed is less than a second wind speed threshold, the second wind speed threshold being less than the first wind speed threshold.

10. The method of claim 1, wherein selecting a second subset of the HVAC information corresponding to a second time interval characterized at least in part by a second wind speed value comprises selecting a second subset of the HVAC information in which the second wind speed value is less than 10% of a maximum wind speed value measured throughout a past period of time.

11. The method of claim 1, wherein computing, using the at least one computing device and based on the first and second subsets of the HVAC information, the air leakage parameter comprises computing an ACH50 parameter, and wherein determining, based on the air leakage parameter, suitability of the building for the retrofit opportunity comprises determining, based on the ACH50 parameter, suitability of the building for the retrofit opportunity.

12. An apparatus comprising:

at least processor; and at least one storage medium having encoded thereon executable instructions that, when executed by the at least one processor, cause the at least one processor to perform a method comprising:

obtaining, from an electronic meter of the building, heating, ventilation and air conditioning (HVAC) information indicative of HVAC runtime at a building;

selecting a first subset of the HVAC information corresponding to a set of first time intervals characterized at least in part by a first wind speed value;

selecting a second subset of the HVAC information by matching each time interval within the first set of time intervals with a corresponding second time interval characterized at least in part by a second wind speed value less than the first wind speed value, wherein each second time interval has a start or end timestamp that satisfies a threshold in relation to a start or end timestamp of each first time interval, wherein the first and second wind speed values represent information relating to wind speed during the first and second time intervals, respectively, each second time interval having at least one outdoor weather parameter and indoor weather parameter that satisfies a similarity threshold when compared with corresponding outdoor and indoor weather parameters of a corresponding first time interval;

computing, based on the first and second subsets of the HVAC information and a stack effect parameter, an air leakage parameter indicative of an air leakage of the building, wherein the stack effect parameter is calculated based on a relationship to a wind effect parameter;

computing at least one confidence interval for one or more thermal characteristics of the building comprising at least one of a value indicative of a thermal insulation or a value indicative of a heating, ventilation and air conditioning (HVAC) efficiency;

executing a computer model to calculate an estimated one or more thermal characteristics of the building, wherein the computer model identifies possible values of the estimated one or more thermal characteristics of the building in accordance with the at least one confidence interval;

simulating a set of retrofit opportunity scenarios to determine determining, based on the air leakage parameter, suitability of the building for a retrofit opportunity to improve energy efficiency of the building, wherein for each retrofit opportunity scenario the processor calculates one or more simulated air leakage parameters and the one or more simulated thermal characteristics for the building and compares the simulated air leakage parameters with the computed air leakage of the building; and generating and transmitting an electronic notification to an electronic device associated with the building, the notification comprising at least one recommendation corresponding to at least one simulated retrofit opportunity to improve energy efficiency of the building by modifying at least the air leakage of the building.

13. The apparatus of claim 12, wherein obtaining the HVAC information comprises:

receiving, from a communicating thermostat disposed at the building, temperature data indicative of a temperature at the building; and computing the HVAC information based on the temperature data.

14. The apparatus of claim 12, wherein obtaining the HVAC information comprises:

receiving resource consumption data from a resource consumption meter disposed at the building; and computing the HVAC information based on the resource consumption data.

15. The apparatus of claim 12, wherein selecting a first subset of the HVAC information corresponding to a first time interval characterized at least in part by a first wind speed value and selecting a second subset of the HVAC information corresponding to a second time interval characterized at least in part by a second wind speed value comprises selecting the first and second subsets of the HVAC information corresponding to the first and second time intervals being characterized by first and second internal human activity data, respectively, indicative of human activity at the building, wherein the first internal human activity data is within a threshold value of the second internal human activity data.

16. The apparatus of claim 12, wherein selecting a first subset of the HVAC information corresponding to a first time interval characterized at least in part by a first wind speed value and selecting a second subset of the HVAC information corresponding to a second time interval characterized at least in part by a second wind speed value comprises selecting the first and second subsets of the HVAC information corresponding to the first and second time intervals being characterized by first and second solar irradiation data, respectively, wherein the first solar irradiation data is within a threshold value of the second solar irradiation data.

17. The apparatus of claim 12, wherein selecting a first subset of the HVAC information corresponding to a first time interval characterized at least in part by a first wind speed value and selecting a second subset of the HVAC information corresponding to a second time interval characterized at least in part by a second wind speed value comprises selecting the first and second subsets of the HVAC information corresponding, respectively, to the first time interval being defined at a first clock interval and the second time interval being defined at a second clock interval, the first clock interval being within a threshold range of the second clock interval.

18. The apparatus of claim 12, wherein selecting a first subset of the HVAC information corresponding to a first time interval characterized at least in part by a first wind speed value comprises selecting a first subset of the HVAC information in which the first wind speed value is at least 50% of a maximum wind speed value measured throughout a past period of time.

* * * * *